United States Patent
Cappiello et al.

(10) Patent No.: US 6,577,786 B1
(45) Date of Patent: Jun. 10, 2003

(54) DEVICE AND METHOD FOR OPTICAL PERFORMANCE MONITORING IN AN OPTICAL COMMUNICATIONS NETWORK

(75) Inventors: Gregory G. Cappiello, Windham, NH (US); Michael Sussman, Winchester, MA (US); Mikhail N. Sokolskiy, St. Petersburg (RU)

(73) Assignee: Digital Lightwave, Inc., North Chelmsford, MA (US)

( * ) Notice: Subject to any disclaimer, the term of this patent is extended or adjusted under 35 U.S.C. 154(b) by 2 days.

(21) Appl. No.: 09/724,804

(22) Filed: Nov. 28, 2000

Related U.S. Application Data

(60) Provisional application No. 60/208,478, filed on Jun. 2, 2000, provisional application No. 60/208,482, filed on Jun. 2, 2000, provisional application No. 60/208,477, filed on Jun. 2, 2000, and provisional application No. 60/208,483, filed on Jun. 2, 2000.

(51) Int. Cl.[7] .................................................. G02B 6/28
(52) U.S. Cl. ........................................................ 385/24
(58) Field of Search ............................. 385/24, 37, 31, 385/42; 359/124, 115, 130

(56) References Cited

U.S. PATENT DOCUMENTS

| | | | |
|---|---|---|---|
| 4,012,843 A | 3/1977 | Harada et al. ................. 33/19 |
| 4,111,524 A | 9/1978 | Tomlinson, III ......... 350/96.19 |
| 4,153,330 A | 5/1979 | Tomlinson, III ......... 350/96.17 |
| 4,198,117 A | 4/1980 | Kobayashi ............... 350/96.19 |
| 4,219,933 A | 9/1980 | Kita et al. ..................... 33/19 |
| 4,246,338 A | 1/1981 | Kaplan ....................... 403/496 |
| 4,299,488 A | 11/1981 | Tomlinson, III ............ 356/328 |
| 4,343,532 A | 8/1982 | Palmer .................... 350/96.19 |
| 4,387,955 A | 6/1983 | Ludman et al. .......... 350/96.19 |
| 4,426,130 A | 1/1984 | Knop ....................... 350/162.2 |
| 4,652,080 A | 3/1987 | Carter et al. ............. 350/96.19 |
| 4,736,360 A | 4/1988 | McMahon .................... 370/3 |
| 4,741,588 A | 5/1988 | Nicia et al. .............. 350/96.19 |
| 4,846,552 A | 7/1989 | Veldkamp et al. ....... 350/162.2 |
| 4,857,726 A | 8/1989 | Kinney et al. ............... 250/226 |
| 4,926,412 A | 5/1990 | Jannson et al. ................. 370/3 |
| 4,930,855 A | 6/1990 | Clark et al. .............. 350/96.19 |
| 5,007,708 A | 4/1991 | Gaylord et al. .......... 350/162.2 |
| 5,026,131 A | 6/1991 | Jannson et al. ............. 350/3.7 |
| 5,061,025 A | 10/1991 | Debesis ....................... 359/18 |
| 5,080,465 A | 1/1992 | Laude ........................ 359/571 |
| 5,085,496 A | 2/1992 | Yoshida et al. ............. 359/569 |
| 5,216,680 A | 6/1993 | Magnusson et al. .......... 372/20 |
| 5,233,405 A | 8/1993 | Wildnauer et al. .......... 356/333 |
| 5,278,687 A | 1/1994 | Jannson et al. ............. 359/125 |
| 5,363,220 A | 11/1994 | Kuwayama et al. ........... 359/3 |
| 5,403,040 A | 4/1995 | Mowry, Jr. et al. ........... 283/91 |
| 5,420,719 A | 5/1995 | Montgomery et al. ...... 359/566 |
| 5,422,745 A | 6/1995 | Williams et al. ................ 359/3 |
| 5,450,510 A | 9/1995 | Boord et al. .................. 385/37 |
| 5,450,512 A | 9/1995 | Asakura ....................... 385/48 |

(List continued on next page.)

FOREIGN PATENT DOCUMENTS

| | | |
|---|---|---|
| EP | 0 297 437 A2 | 1/1989 |
| EP | 0323238 A2 | 7/1989 |
| EP | 0540966 A1 | 5/1993 |

(List continued on next page.)

OTHER PUBLICATIONS

Wade, Application No. 09/382,492, Aug. 25, 1999.
Cappiello et al., Application No. 09/545,826, Apr. 10, 2000.

(List continued on next page.)

Primary Examiner—Javaid Nasri
(74) Attorney, Agent, or Firm—Jenkens & Gilchrist, P.C.

(57) ABSTRACT

An optical performance monitoring device and corresponding diffraction grating are disclosed for utilization within a fiber optic communications network. The diffraction grating includes a substrate and reflective material adjacent the substrate, wherein the diffraction grating is substantially polarization insensitive over a wavelength range of approximately 30 nm.

67 Claims, 15 Drawing Sheets

U.S. PATENT DOCUMENTS

| | | | |
|---|---|---|---|
| 5,457,573 A | 10/1995 | Iida et al. | 359/569 |
| 5,526,155 A | 6/1996 | Knox et al. | 359/130 |
| 5,555,334 A | 9/1996 | Ohnishi et al. | 385/93 |
| 5,583,683 A | 12/1996 | Scobey | 359/127 |
| 5,748,815 A | 5/1998 | Hamel et al. | 385/37 |
| 5,777,763 A | 7/1998 | Tomlinson, III | 359/130 |
| 5,793,912 A | 8/1998 | Boord et al. | 385/37 |
| 5,796,479 A | 8/1998 | Derickson et al. | 356/326 |
| 5,835,458 A | 11/1998 | Bischel et al. | 369/44.12 |
| 5,907,436 A | 5/1999 | Perry et al. | 359/576 |
| 5,912,997 A | 6/1999 | Bischel et al. | 385/15 |
| 5,914,811 A | 6/1999 | Chen et al. | 359/495 |
| 5,937,113 A | 8/1999 | He et al. | 385/11 |
| 5,946,128 A | 8/1999 | Pack | 359/305 |
| 5,970,190 A | 10/1999 | Fu et al. | 385/37 |
| 6,002,522 A | 12/1999 | Todori et al. | 359/573 |
| 2001/0046087 A1 | 11/2001 | Hoose | 359/573 |

FOREIGN PATENT DOCUMENTS

| | | |
|---|---|---|
| EP | 0 859 249 A1 | 8/1998 |
| EP | 1 130 422 A1 | 9/2001 |
| WO | WO 99/41858 | 8/1999 |
| WO | WO9948197 | 9/1999 |
| WO | WO9967609 A1 | 12/1999 |
| WO | WO 01/07947 A1 | 2/2001 |
| WO | WO0118577 A1 | 3/2001 |
| WO | WO0173484 A1 | 10/2001 |
| WO | WO0206860 A1 | 1/2002 |

OTHER PUBLICATIONS

Cappiello et al., Application No. 09/724,771, Nov. 28, 2000.

Cappiello et al., Application No. 09/724,770, Nov. 28, 2000.

Cappiello, Application No. 09/724,638, Nov. 28, 2000.

Cappiello, Application No. 09/724,604, Nov. 28, 2000.

Sussman et al., Application No. 09/724,717, Nov. 28, 2000.

Cappiello et al., Application No. 09/724,803, Nov. 28, 2000.

Simova, et al., "A Complete System for Characterization of Spectrally Selective Fiber–Optic Devices" *Part of the 18th Congress of the International Commission for Optics: Optics for the Next Millennium*, SPIE vol. 3749, Aug. 1999, pp. 124–125.

Simova, et al., "Spectral Characterization and Chromatic Dispersion Measurements in Fiber Bragg Gratings for Dispersion Compression" *IEEE Instrumentation and Measurement Technology Conference*, May 18–21, 1998, pp. 712–715.

Garrett, et al. "Ultra–Wideband WDM Transmission Using Cascaded Chirped Fiber Gratings" *AT&T Labs, Optical Fiber Communication*, Optical Society of America, pp. PD15–1–PD15–3 No Date.

Chua, et al., "Component Technology Enables High–Capacity DWDM Systems" *Lightwave*, Aug. 1998, pp. 64, 66, 68–69.

Patent Abstracts of Japan, Sep. 4, 1987, JP 62 200320 A, abstract.

Laude, "Stable Monoblock Wavelength Division Multiplexers with Channel Spacings Down to 0.5 nm Usable as Practical Wavelength Reference Tools in Optical Fibre Communication Systems"; *Pure and Applied Optics*, Nov. 1994, pp. 963–974.

International Search Report, PCT/US01/17696, dated Nov. 6, 2002.

DEVICE AND METHOD FOR OPTICAL PERFORMANCE MONITORING IN AN OPTICAL COMMUNICATIONS NETWORK

CROSS-REFERENCE TO RELATED APPLICATIONS

This patent application is related to and claims priority from U.S. Provisional Patent Application No. 60/208,478, filed Jun. 2, 2000; U.S. Provisional Patent Application No. 60/208,482, filed Jun. 2, 2000; U.S. Provisional Patent Application No. 60/208,477, filed Jun. 2, 2000; and U.S. Provisional Patent Application No. 60/208,483, filed Jun. 2, 2000. This application is also related to U.S. patent application Ser. No. 09/382,492, filed Aug. 25, 1999; U.S. patent application Ser. No. 09/545,826, filed Apr. 10, 2000; U.S. patent application Ser. No. 09/724,771, filed Nov. 28, 2000, entitled "ATHERMALIZATION AND PRESSURE DESENSITIZATION OF DIFFRACTION GRATING BASED ON WDM DEVICES"; U.S. patent application Ser. No. 09/724,770 filed Nov. 28, 2000, entitled "ATHERMALIZATION AND PRESSURE DESENSITIZATION OF DIFFRACTION GRATING BASED WDM DEVICES"; U.S. patent application Ser. No. 09/724,638 filed Nov. 28, 2000, entitled "ATHERMALIZATION AND PRESSURE DESENSITIZATION OF DIFFRACTION GRATING BASED SPECTROMETER DEVICES"; U.S. patent application Ser. No. 09/724,604 filed Nov. 28, 2000, entitled "ATHERMALIZATION AND PRESSURE DESENSITIZATION OF DIFFRACTION GRATING BASED SPECTROMETER DEVICES"; U.S. patent application Ser. No. 09/724,717 filed Nov. 28, 2000, entitled "OPTICAL PERFORMANCE MONITOR WITH OPTIMIZED FOCUS SPOT SIZE"; and U.S. patent application Ser. No. 09/724,803 filed Nov. 28, 2000, entitled "DIFFRACTION GRATING FOR WAVELENGTH DIVISION MULTIPLEXING/DEMULTIPLEXING DEVICES". The above-identified applications are hereby incorporated by reference herein in their entirety.

FIELD OF THE INVENTION

The present invention relates generally to monitoring optical signals, more particularly, to a spectrometer and corresponding diffraction grating having improved performance.

BACKGROUND OF THE INVENTION

The telecommunications industry has grown significantly in recent years due to developments in technology, including the Internet, e-mail, cellular telephones, and fax machines. These technologies have become affordable to the average consumer such that the volume of traffic on telecommunications networks has grown significantly. Furthermore, as the Internet has evolved, more sophisticated applications have increased data volume being communicated across telecommunications networks.

To accommodate the increased data volume, the telecommunications network infrastructure has been evolving to increase the bandwidth of the telecommunications network. Fiber optic networks that carry wavelength division multiplexed optical signals or channels provide for significantly increased data channels for the high volume of traffic. The wavelength division multiplexed optical channels or polychromatic optical signals comprise narrowband optical signals. The wavelength division multiplexed optical channels carry packets containing information, including voice and data. Contemporary optical networks can include forty or more narrowband optical channels on a single fiber and each narrowband optical channel can carry many thousands of simultaneous telephone conversations or data transmissions, for example. An optical component often utilized in performing a number of operations in optical networks is a diffraction grating.

Wavelength division multiplexed optical systems, such as systems utilizing diffraction gratings for performing multiplexing and demultiplexing operations, have the advantage of parallelism in transmitting optical signals. This yields higher performance and lower cost for high channel count systems. In particular, a diffraction grating is a device that diffracts light by an amount varying according to its wavelength. For example, if sunlight falls on a diffraction grating at the correct angle, the sunlight is broken up into its individual component colors (i.e., rainbow).

Gratings work in both transmission (where light passes through a material with a grating written on its surface) and in reflection (where light is reflected from a material with a grating written on its surface). In optical communications, reflective gratings have a widespread use. A reflective diffraction grating includes a very closely spaced set of parallel lines or grooves made in a mirror surface of a solid material. A grating can be formed in most materials wherein the optical properties thereof are varied in a regular way, having a period that is relatively close to the wavelength. Incident light rays are reflected from different lines or grooves in the grating. Interference effects prevent reflections that are not in-phase with each other from propagating.

There are two primary groove profiles in conventional diffraction gratings, blazed gratings and sinusoidal gratings. The blazed grating includes a jagged or sawtooth shaped profile. The sinusoidal grating has a sinusoidal profile along the surface of the grating.

The diffraction equation for a grating is generally described by $$Gm\lambda = n(\sin(\alpha) + \sin(\beta))$$

where, $G=1/d$ is the groove frequency in grooves per millimeter and d is the distance between adjacent grooves, m is the diffraction order, $\lambda$ is the wavelength of light in millimeters, $\alpha$ is the incident angle with respect to the grating normal, $\beta$ is the exiting angle with respect to the grating normal, and n is the refractive index of the medium above the grooves.

FIG. 14A is a representative pictorial showing optical characteristics of a blazed diffraction grating in reflecting a narrowband optical signal. The blaze diffraction grating 900 is defined by certain physical parameters that effect optical performance. These physical parameters include the reflection surface material, the number of grooves g per millimeter, blaze angle $\theta_B$, and the index of refraction of an immersed grating medium 902. The reflection surface 905 typically resides on a substrate 910.

As shown on FIG. 14A, the groove spacing is defined by d. An incident narrowband optical signal with a center wavelength $\lambda_1$ has an incident angle $\alpha_1$ (measured from the grating normal $N_g$) and a reflection angle $\beta_1$ (also measured from the grating normal $N_g$). The angle between the grating normal $N_g$ and the facet normal $N_f$ defines the blaze angle $\theta_B$.

As previously discussed, when light is incident on a grating surface, it is diffracted in discrete directions. The light diffracted from each groove of the grating combines to form a diffracted wavefront. There exists a unique set of discrete or distinct angles based upon a given spacing between grooves that the diffracted light from each facet is in phase with the diffracted light from any other facet. At these discrete angles, the in-phase diffracted light combine constructively to form the reflected narrowband light signal.

In practice, narrowband light signals or beams are not truly monochromatic, but rather a tight range of wavelengths. Each signal is defined by a narrow passband and has a center wavelength which is the representative wavelength to which an optical signal is associated. Each center wavelength is generally predefined, and may correspond with an industry standard, such as the standards set by the International Telecommunication Union.

A sinusoidal diffraction grating is similarly described by the equation above. When $\alpha=\beta$, the reflected light is diffracted directly back toward the direction from which the incident light was received. This is known as the Littrow condition. At the Littrow condition, the diffraction equation becomes $$m*\lambda=2*d*n*\sin(\alpha),$$

where n is the index of refraction of the immersed grating medium 902 in which the diffraction grating is immersed.

FIG. 14B is a representative pictorial showing optical characteristics of a sinusoidal diffraction grating. Sinusoidal gratings, however, do not have a blaze angle parameter, but rather have groove depth (d). An immersed grating medium 955 resides on the sinusoidal grating surface 950 having a certain index of refraction, n. The diffraction grating equation discussed above describes the optical characteristics of the sinusoidal diffraction grating based upon the physical characteristics thereof.

FIG. 14c shows a polychromatic light ray being diffracted from a blazed grating 960. An incident ray (at an incident angle $\theta_i$ to the normal) is projected onto the blazed grating 960. A number of reflected and refracted rays are produced corresponding to different diffraction orders (values of m=0, 1, 2, 3 . . . ). The reflected rays corresponding to the diffraction order having the highest efficiency (i.e., lowest loss) are utilized in optical systems.

An important component of the fiber optic networks is an optical performance monitor (OPM) for monitoring the performance of the optical system. The OPM provides a network/system operator the ability to monitor the performance of individual narrowband optical signals. The optical performance of the individual narrowband optical signals may include the following metrics, for example, power levels, center wavelength, optical signal-to-noise ratio (OSNR), interference between channels such as crosstalk, and laser drift. By monitoring these metrics, the optical network operator can easily identify and correct problems in the optical network so as to improve the performance of optical communication therein.

One form of an OPM employs a diode array spectrometer that generally includes optical lenses, a dispersion component, and an optical sensor. The optical lenses process the polychromatic optical signal and cause the polychromatic optical signal to be incident to the dispersion component preferably at a near-Littrow condition, which is an condition where the angle of the incident light beam is reflected back toward the source of the incident light beam near the incident angle at at least one wavelength. The dispersion component, typically a diffraction grating, diffracts the polychromatic optical signal into its narrowband optical signals, with each narrowband signal being diffracted at a distinct angle that is a function of the wavelength of the narrowband optical signal. Each narrowband optical signal forms a spot that is focused onto the optical sensor at a distinct location.

Ultimately, signal performance within an OPM device is attributable to a great extent to the performance of the diffraction grating therein. Because the parameter values which describe the diffraction grating often dictate the efficiency and the polarization effects of diffracted optical signals, much time, money, and effort have been dedicated to determining diffraction grating parameter values to effectuate improved optical performance. Due in part to the number of diffraction grating parameters, the considerable range of corresponding parameter values, and the interdependencies between the diffraction grating parameters, designing and implementing a diffraction grating yielding improved performance are nontrivial.

In this regard, designing diffraction gratings must additionally take into account real-world effects that can only be measured empirically to determine if the theoretical parameters for a diffraction grating yield a viable solution. For example, one difficulty in creating improved diffraction gratings is the prolonged time period for creating a master diffraction grating. A single diffraction grating master may take several weeks to produce. Although the master diffraction grating, having a specific set of grating parameters, may yield acceptable results (i.e., low loss or a partially polarization insensitive result), a replicated diffraction grating created from the master diffraction grating may produce less than desirable signal performance characteristics. Consequently, the process of designing and developing diffraction gratings (determining grating parameters that yield good signal and/or master grating related characteristics, producing a master diffraction grating having the determined grating parameters and producing a replicated diffraction grating from the master diffraction grating that yields good signal performance characteristics) so as to produce a diffraction grating having improved performance requires solving both theoretical and practical problems.

Based upon the foregoing, there is a need for a diffraction grating-based OPM having an improved optical performance for employment within an optical system.

SUMMARY OF EXEMPLARY EMBODIMENTS OF THE INVENTION

Embodiments of the present invention are directed to an optical device for monitoring operating conditions of a multiplexed optical signal in an optical communications network. The optical device includes a diffraction grating in optical communication with input ports of the optical device so as to diffract multiplexed optical signals received at the input port as a demultiplexed optical signal having a plurality of narrowband optical signals over a wavelength range of at least approximately 30 nm. Within the wavelength range the optical device is substantially polarization insensitive. The diffraction grating may be a blazed diffraction grating or a sinusoidal diffraction grating.

The optical device may further include an optical detector optically coupled to the diffraction grating for receiving the narrowband optical signals and converting each narrowband optical signal into an electrical signal having a value representative of a power level of the corresponding narrowband optical signal.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF EXEMPLARY EMBODIMENTS

Figure 1A:
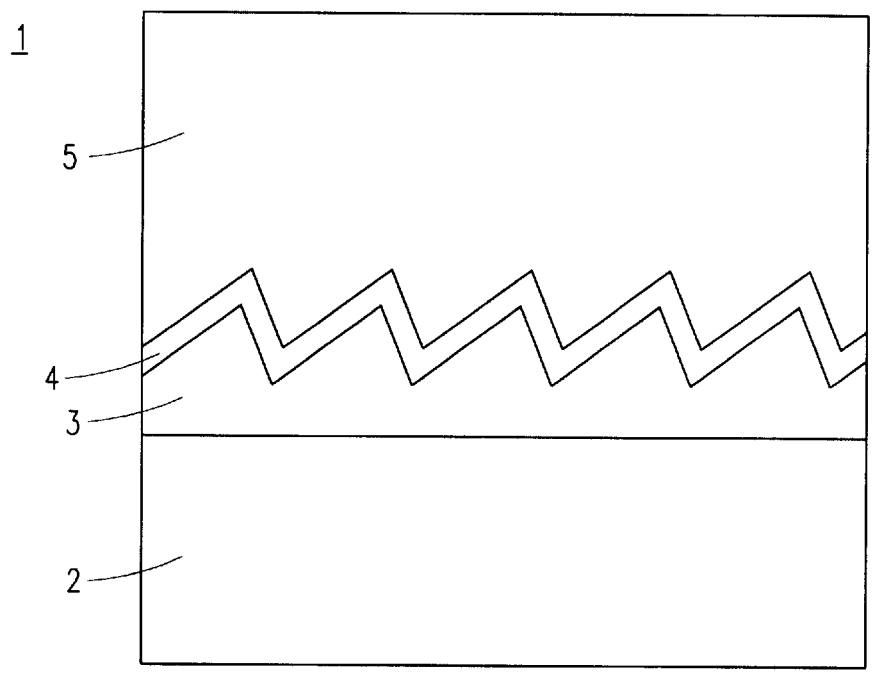
FIGS. 1A and 1B illustrate diffraction grating profiles according to various embodiments of the present invention.

The present invention will now be described more fully hereinafter with reference to the accompanying drawings in which embodiments of the present invention are shown.

Optical networks are utilized to handle telecommunications traffic caused in part by the Internet, mobile communications, and facsimile communications. To improve the performance of optical networks, polychromatic fiber optic lines have been developed to allow for multiple channels to be carried by a single fiber optic line. A central component utilized in fiber optic communication is an optical performance monitor (OPM). An OPM is a specialized spectrometer that is used by fiber optic network operators to monitor the operation of a fiber optic network. The OPM allows the fiber optic network operator to monitor power levels, center wavelengths, optical signal-to-noise ratio, and laser drift, for example, for each narrowband optical channel carried on the fiber optic network. The OPM is coupled to a fiber optic line via an optical splitter so that a polychromatic optical signal or wavelength division multiplexed optical signal is input into the OPM. Through use of a diffraction grating, an OPM demultiplexes the polychromatic optical signal into separate optical channels using a dispersion component and applies each demultiplexed optical signal to an optical detector composed of an array of optical detector elements. As can be understood, measuring demultiplexed optical signals can be utilized to monitor and improve the performance of the optical communications network in which the OPM device is disposed. So that OPM devices accurately monitor signals in the optical network, embodiments of the present invention include a diffraction grating that is polarization insensitive.

An optics device may be described as being "polarization insensitive" if the power levels of the polarization states of one or more optical signals emitted from the device is the same as the power levels of polarization states of corresponding optical input signal(s) to the device. In other words, the device provides equal efficiency for both of the polarization states of the output optical signal (s) emitted from the device. Relatedly, a device is "substantially polarization insensitive" if the power levels of the polarization states of output optical signal(s) emitted from the device are within approximately 20% of the power levels of the corresponding polarization states of input optical signal(s) to the device.

Further, the term "apolarized" is used below in describing the various embodiments of the present invention as meaning a signal condition in which the power of the transverse electric polarization state TE is equal to the power of the transverse magnetic polarization state TM at a pertinent wavelength or set of wavelengths. The term "substantially apolarized" is used below as referring to a signal condition in which the power of the transverse electric polarization state TE and the power of the transverse magnetic polarization state TM are within about 20% of each other at a pertinent wavelength or set of wavelengths. The term "efficiency" used below refers to a characteristic of an optical device. In particular, "efficiency" is used to mean the gain/loss of an optical signal or signal component generated from the optical device, relative to an optical signal received thereat. Relatedly, "polarization dependent loss" or "PDL" refers to a characteristic of an optical device, and is used below to mean the maximum deviation in gain/loss across all input polarization states.

Figure 1B:
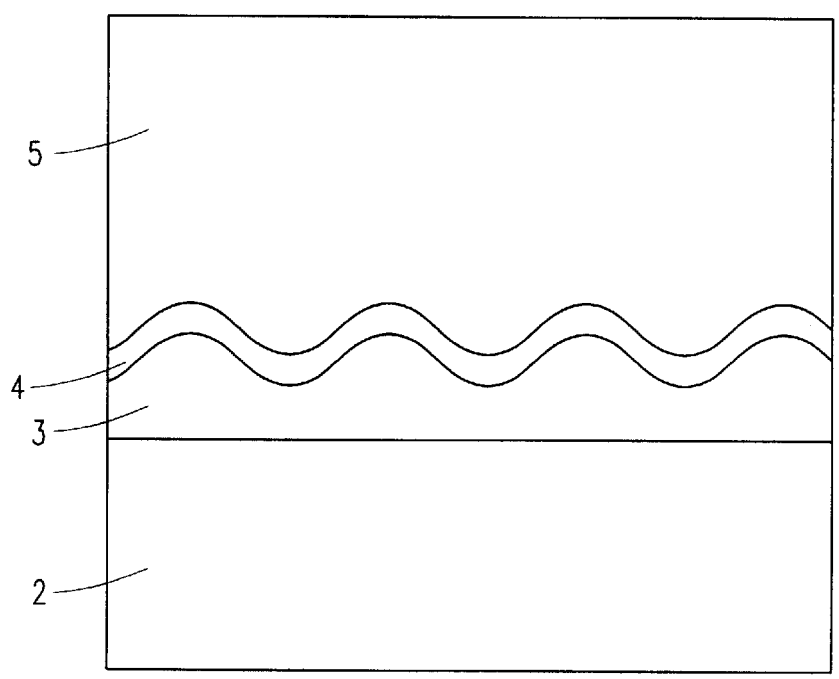

Referring to FIGS. 1A and 1B, there is shown a diffraction grating 1 according to embodiments of the present invention. Diffraction grating 1 is utilized in performing wavelength division multiplexing and demultiplexing operations, as described in greater detail below. Diffraction grating 1 may be a reflective grating so that optical and/or light rays are reflected or diffracted therefrom. Diffraction grating 1 may include a substrate 2 over which the diffractive surface of diffraction grating 1 is formed. Substrate 2 may be constructed from a number of different substances. For example, substrate 2 may be a glass compound. As shown in FIGS. 1A and 1B, substrate 2 may have a substantially planar shape. It is understood, however, that substrate 2 may alternatively include a substantially curved or concave surface (not shown) over which a diffraction grating surface is formed.

Diffraction grating 1 may further include a grating layer 3 which is formed over and/or bonded to a surface of substrate 2. An exposed surface of grating layer 3 may have a grating profile. The grating profile of grating layer 3 may be formed a number of different ways, including the utilization of ruling or holographic techniques, as is known in the art. The particular grating profiles and corresponding characteristics of grating layer 3 according to the embodiments of the present invention will be described in greater detail below.

A reflective layer 4 is formed over and/or bonded to the exposed surface of grating layer 3. Reflective layer 4 substantially forms the particular grating profile of grating layer 3. Reflective layer 4 may be a metal composition, such as gold, aluminum or silver.

An optically transmissive material or coating 5 may be disposed over or adjacent reflective layer 4. Material 5 is utilized to increase the reflectivity of diffraction grating 1. Material 5 is shown in FIG. 1A as being formed directly over reflective material 4. It is understood, however, that an additional layer (not shown), such as a bonding agent having a different index of refraction relative to material 5, may be disposed between material 5 and reflective layer 4.

It is understood that diffraction grating 1 may include additional or fewer layers than described above. For example, a surface of substrate 2 may be worked so as to form a grating profile thereon, and reflective layer 4 bonded to or formed directly on substrate 2. Alternatively, a thickness of reflective layer 4 may be sufficiently dimensioned so that a surface of reflective layer 4 may be worked to form a grating profile thereon, thereby rendering substrate 2 and grating layer 3 unnecessary. Diffraction grating 1, however, will be presented as a three layer diffraction grating for exemplary purposes.

In accordance with the embodiments of the present invention, the grating profile of diffraction grating 1 is characterized to provide enhanced optical communication. The enhanced optical communication performance of diffraction grating 1 is based upon a certain combination of parameters which define the grating profile of diffraction grating 1. As shown in FIG. 1A and in accordance with an embodiment "A" of the present invention, diffraction grating 1 is a blazed grating type. The blaze angle of diffraction grating 1 is between about twenty-seven (27) and about thirty-nine (39) degrees. The number of grooves g per millimeter of diffraction grating 1 may be generally defined by the equation $$(500 \pm 110)*n,$$

where n is the index of refraction of material 5. The number of grooves per millimeter may be more particularly defined: between about 700 and about 800 when the index of refraction n of material 5 is between about 1.44 and about 1.64 and the blaze angle is between about 27 and about 32 degrees; between about 850 and about 950 when the index of refraction n of material 5 is between about 1.44 and about 1.64 and the blaze angle is between about 31 and about 34 degrees; and between about 950 and about 1050 when the index of refraction n of material 5 is between about 1.44 and about 1.64 and the blaze angle is between about 34 and about 39 degrees. In addition, the diffraction order utilized with embodiment A of diffraction grating 1 is the first order. The particular parameter values for embodiment A of diffraction 10 are summarized below in the following Table.

both the transverse electric polarization state TE and the transverse magnetic polarization state TM exceed 80% (the PDL being as low as 0.25 dB) over both the C-band and L-band wavelength ranges. Further, because the efficiencies of transverse electric polarization state TE and transverse magnetic polarization state TM are substantially the same across the C-band wavelength range and the L-band wavelength range, diffraction grating 1 diffracts substantially apolarized optic rays in response to the apolarized input optical signal. Consequently, diffraction grating 1 is substantially polarization insensitive across the C-band wavelength range (about 1520 nm to about 1566 nm) and the L-band wavelength range (about 1560 nm to about 1610 nm).

Still further, the cross-over point for the efficiency of the transverse electric polarization state TE and the efficiency of the transverse magnetic polarization state TM occurs in the C-band wavelength range, and particularly in the upper half thereof. The high efficiency combined with the location of the efficiency cross-over location result in diffraction grating 1 providing enhanced optical performance in both the C-band and L-band wavelength ranges.

In accordance with another embodiment of the present diffraction grating invention, FIG. 1B shows the profile of embodiment "B" of a diffraction grating 1 of the sinusoidal grating type. The groove depth d of diffraction grating 1 of embodiment B may be generally defined by the equation $$(685 \pm 40)/n,$$

where n is the index of refraction of material 5. The groove depth may be more particularly defined between about 420 nm and about 470 nm when material 5 has an index of refraction between about 1.44 and about 1.64. The number of grooves g per millimeter of diffraction grating 1 may be generally defined by the equation $$(500 \pm 110)*n,$$

and more particularly defined between about 700 and about 800 when material 5 has an index of refraction between

TABLE

DIFFRACTION GRATING PARAMETERS

| Grating Type | Reflection Surface | Grooves per Millimeter | Groove Depth (nm) | Index of refraction of immersed grating medium (typical) | blaze angle (degs) | diff. order |
|---|---|---|---|---|---|---|
| A blazed | aluminum or gold | 750 ± 50 | — | 1.44–1.64 | 27–32 | 1 |
|  |  | 900 ± 50 |  | 1.44–1.64 | 31–34 |  |
|  |  | 1000 ± 50 |  | 1.44–1.64 | 34–39 |  |
|  |  | (500 ± 110)n |  |  |  |  |
| B sinusoidal | aluminum or gold | 750 ± 50 | 420–470 | 1.44–1.64 | — | 1 |
|  |  | (500 ± 110)n | (685 ± 40)/n |  |  |  |
| C blazed | aluminum or gold | 300 ± 40 (200 ± 40)n | — | 1.44–1.64 | 37–40 | 4 |
| D blazed | aluminum or gold | 600 ± 40 (450 ± 40)n | — | 1.44–1.64 | 41–44 | 2 |
| E blazed | aluminum or gold | 200 ± 20 (200 ± 20)n | — | 1.0 (air) | 68–76 | 5 |
| F blazed | aluminum or gold | 250 ± 30 (250 ± 30)n | — | 1.0 (air) | 50–56 | 4 |

Figure 2:
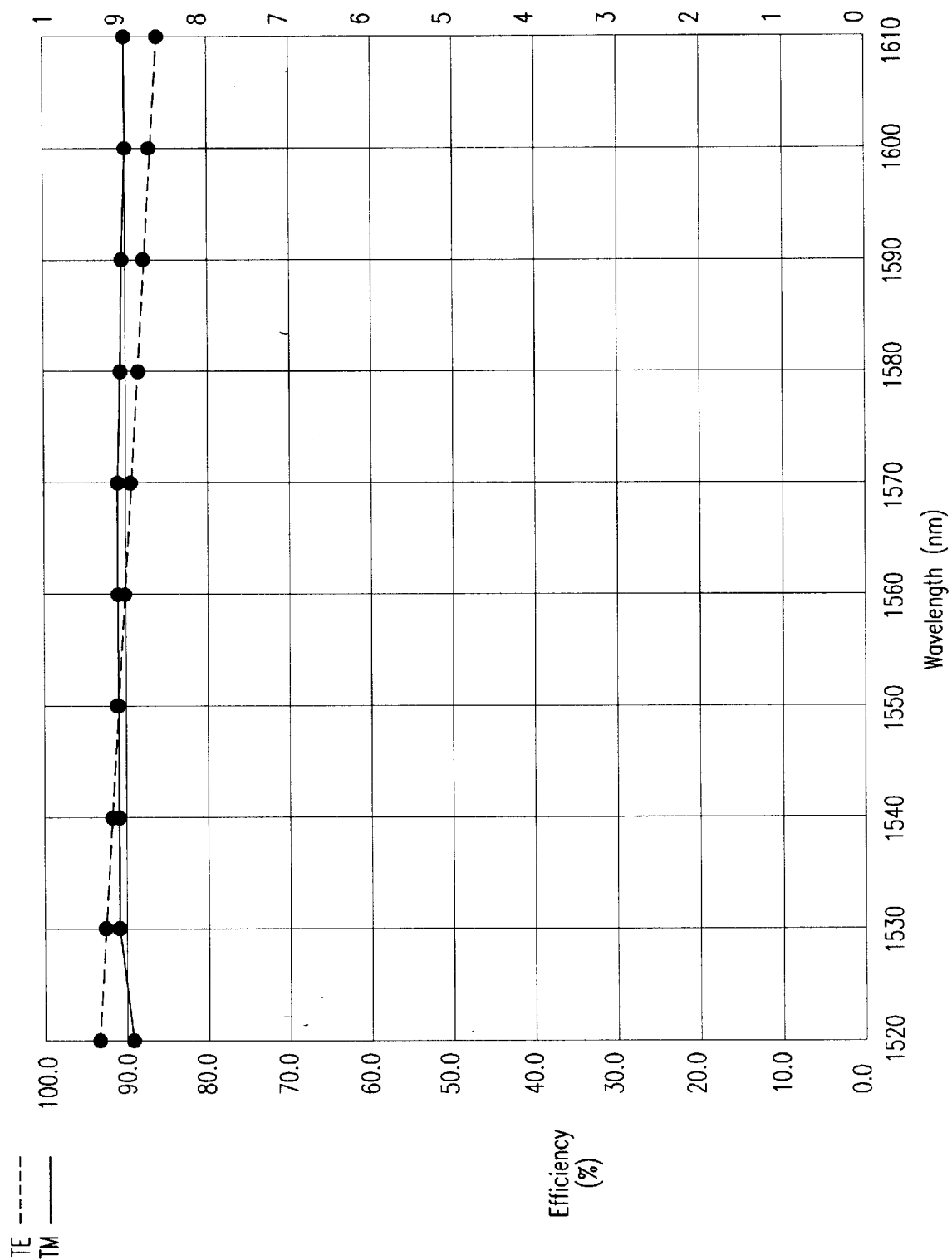
FIGS. 2–7 are graphs showing the efficiencies of the various diffraction gratings according to embodiments of the present invention.

FIG. 2 illustrates the resulting performance of embodiment A of diffraction grating 1 having the grating parameter values described above, based upon receiving an a polarized optical signal as an input. As can be seen, the efficiency of about 1.44 and about 1.64. In addition, the diffraction order utilized with embodiment B of diffraction grating 1 is the first order. The particular parameter values for embodiment B of diffraction 10 are summarized in the Table.

Figure 3:
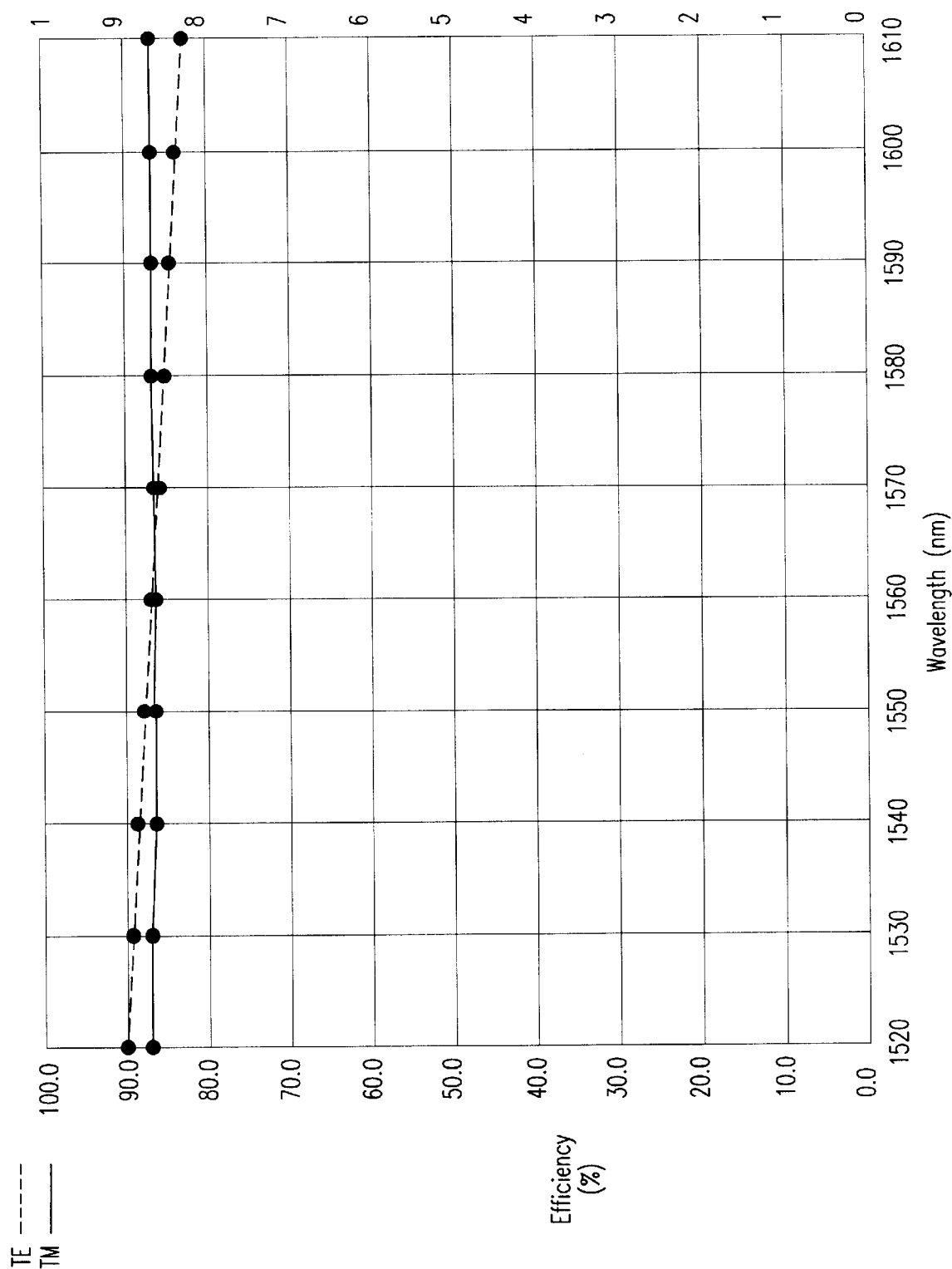

FIG. 3 illustrates the resulting performance of embodiment B of diffraction grating 1 having the grating parameter values described above, based upon receiving an apolarized optical signal as an input. As can be seen, the efficiency of both the transverse electric polarization state TE and the transverse magnetic polarization state TM exceed 80% over the C-band and L-band wavelength ranges. Further, because the efficiencies of transverse electric polarization state TE and transverse magnetic polarization state TM are substantially the same and/or closely follow each other across the C-band and L-band wavelength ranges, diffraction grating 1 diffracts substantially apolarized optic rays in response to the apolarized input optical signal. Consequently, diffraction grating 1 is substantially polarization insensitive across the C-band and L-band wavelength ranges.

Still further, the cross-over point for the efficiency of the transverse electric polarization state TE and the efficiency of the transverse magnetic polarization state TM occurs in the C-band wavelength range, and particularly in the upper end thereof. The high efficiency combined with the location of the efficiency cross-over point result in diffraction grating 1 providing enhanced optical performance in both the C-band wavelength range and the L-band wavelength ranges.

In accordance with another embodiment of the present diffraction grating invention, FIG. 1A illustrates the profile of embodiment "C" of a diffraction grating 1 of the blazed grating type The blaze angle of diffraction grating 1 is between about thirty-seven (37) and about forty (40) degrees. The number of grooves G per millimeter of diffraction grating 1 may be generally defined by the equation $$(200\pm40)*n,$$

where n is the index of refraction of material 5. More specifically, the number of grooves may be between about 260 and about 340 when material 5 has an index of refraction n between about 1.44 and about 1.64. In addition, the diffraction order utilized with embodiment C of diffraction grating 1 is the fourth order. The particular parameter values for embodiment C of diffraction 10 are summarized the Table.

Figure 4:
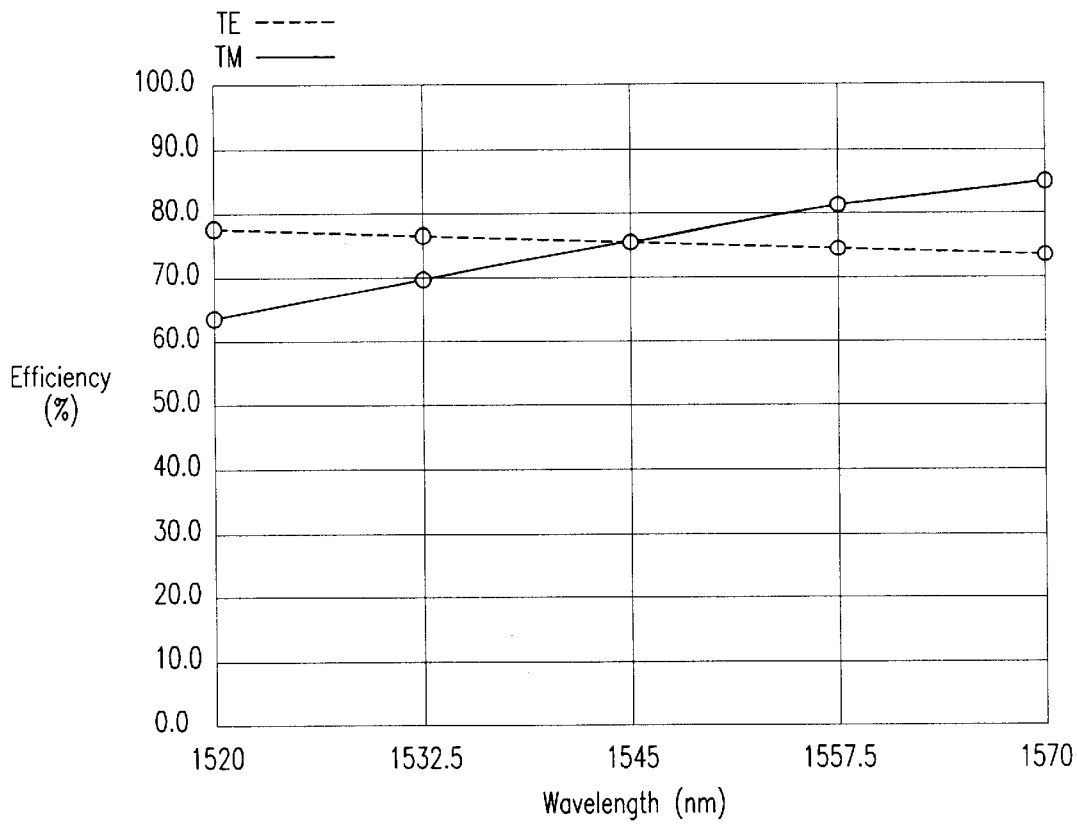

FIG. 4 illustrates the resulting performance of embodiment C of diffraction grating 1 having the grating parameter values described above, based upon receiving an apolarized optical signal as an input. As can be seen, the efficiency of both the transverse electric polarization state TE and the transverse magnetic polarization state TM exceed 60% over the C-band wavelength range. Further, because the efficiencies of transverse electric polarization state TE and transverse magnetic polarization state TM somewhat closely follow each other across the C-band wavelength range, embodiment C of diffraction grating 1 diffracts substantially apolarized optic rays in response to the apolarized input optical signal.

Still further, the cross-over point for the efficiency of the transverse electric polarization state TE and the efficiency of the transverse magnetic polarization state TM occurs in the C-band wavelength range, and particularly around the midpoint thereof. The high efficiency combined with the location of the efficiency cross-over point result in diffraction grating 1 providing enhanced optical performance in the C-band wavelength range.

In accordance with another embodiment of the present diffraction grating invention, FIG. 3A shows the profile of embodiment "D" of a diffraction grating 1 of the blazed grating type. The blaze angle of embodiment D of diffraction grating 1 is between about forty-one (41) and about forty-four (44) degrees. The number of grooves G per millimeter of diffraction grating 1 may be generally defined by the equation $$(450\pm40)*n,$$

where n is the index of refraction of material 5. More specifically, the number of grooves may be between about 560 and about 640 when material 5 has an index of refraction n between about 1.44 and about 1.64. In addition, the diffraction order utilized with embodiment D of diffraction grating 1 is the second order. The particular parameter values for embodiment D of diffraction 10 are summarized in the Table.

Figure 5:
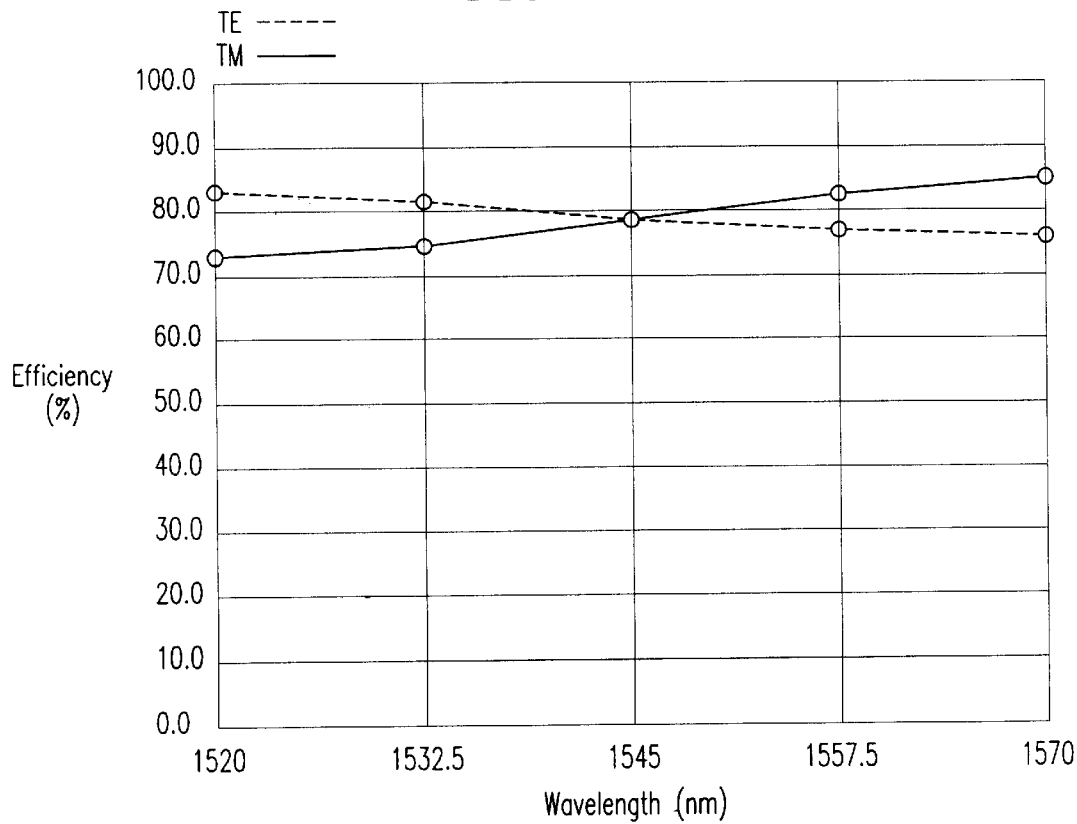

FIG. 5 illustrates the resulting performance of embodiment D of diffraction grating 1 having the grating parameter values described above, based upon receiving an apolarized optical signal as an input. As can be seen, the efficiency of both the transverse electric polarization state TE and the transverse magnetic polarization state TM exceed 70% over the C-band wavelength range. Further, because the efficiencies of transverse electric polarization state TE and transverse magnetic polarization state TM somewhat closely follow each other across the C-band wavelength range embodiment D of diffraction grating 1 diffracts substantially apolarized optic rays in the C-band wavelength range in response to the apolarized input optical signal.

In accordance with another embodiment of the present diffraction grating invention, FIG. 3A shows the profile of embodiment "E" of a diffraction grating 1 of the blazed grating type. The blaze angle of embodiment E of diffraction grating 1 is between about sixty-eight (68) and about seventy-six (76) degrees. The number of grooves G per millimeter of embodiment E of diffraction grating 1 may be generally defined by the equation $$(200\pm20)*n,$$

where n is the index of refraction of material 5. More specifically, the number of grooves may be between about 180 and about 220 when material 5 is air or otherwise has an index of refraction of about 1.0. In addition, the diffraction order utilized with embodiment E of diffraction grating 1 is the fifth order. The particular parameters for embodiment E of diffraction 10 are summarized in the Table.

Figure 6:
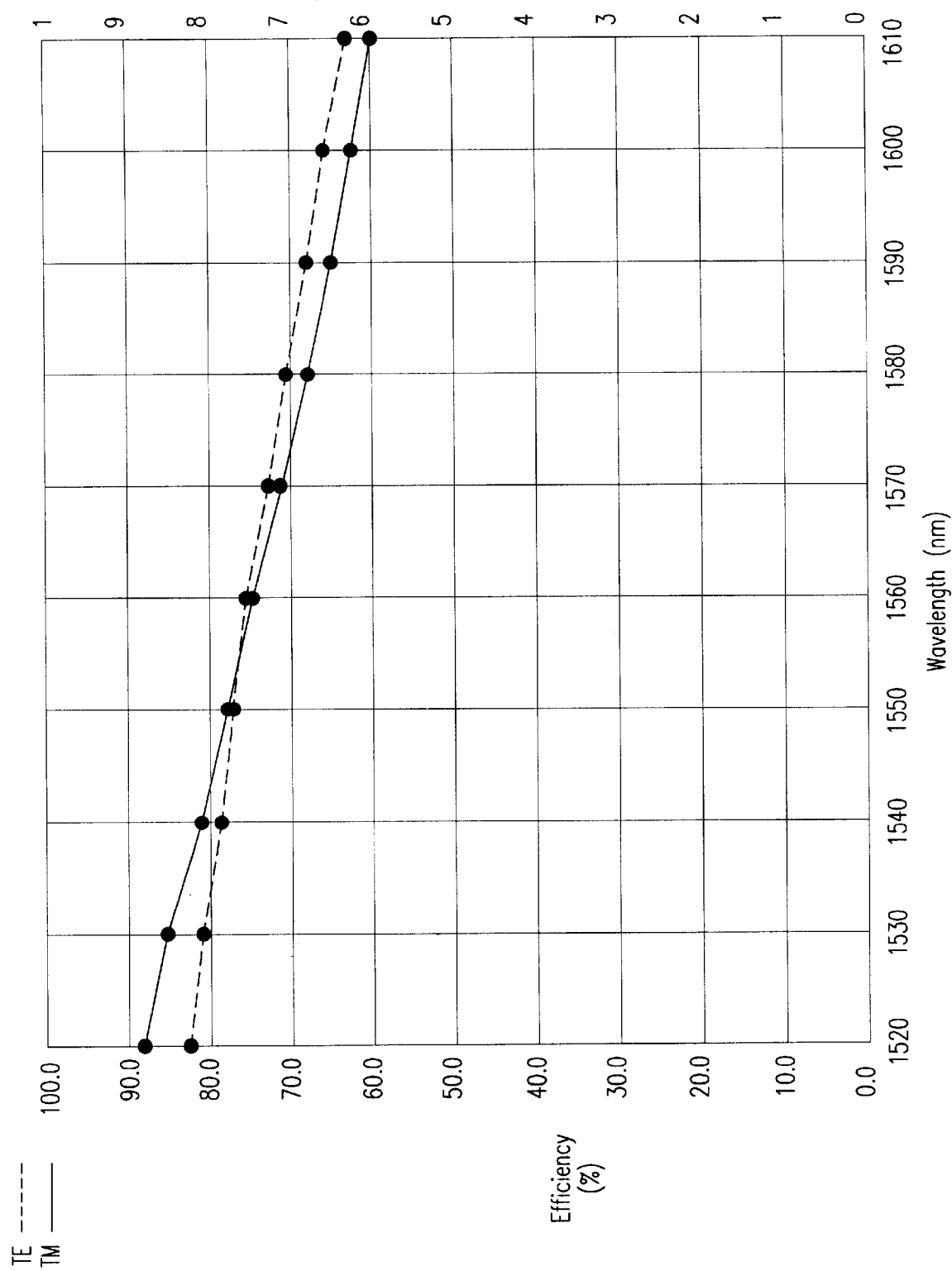

FIG. 6 illustrates the resulting performance of embodiment E of diffraction grating 1 having the grating parameter values described above, based upon receiving an apolarized optical signal as an input. As can be seen, the efficiency of both the transverse electric polarization state TE and the transverse magnetic polarization state TM exceed 70% over the C-band wavelength range, and exceed 60% over the L-band wavelength range. Further, because the efficiencies of transverse electric polarization state TE and transverse magnetic polarization state TM somewhat closely follow each other across the C-band and L-band wavelength ranges, embodiment E of diffraction grating 1 diffracts substantially apolarized optic rays across the C-band and L-band wavelength ranges in response to the apolarized input optical signal. Still further, the cross-over point for the efficiency of the transverse electric polarization state TE and the efficiency of the transverse magnetic polarization state TM occurs in the C-band wavelength range, and particularly around the midpoint thereof. The high efficiency combined with the location of the efficiency cross-over point result in embodiment E of diffraction grating 1 providing enhanced optical performance in both the C-band wavelength range and the L-band wavelength range.

In accordance with another embodiment of the present diffraction grating invention, FIG. 3A shows the profile of embodiment "F" of a diffraction grating 1 of the blazed grating type. The blaze angle of embodiment F of diffraction grating 1 is between about fifty (50) and about fifty-six (56) degrees. The number of grooves G per millimeter of embodiment F of diffraction grating 1 may be generally defined by the equation $$(250\pm30)*n,$$

where n is the index of refraction of material 5. More specifically, the number of grooves may be between about 220 and about 280 when material 5 is air or otherwise has an index of refraction of about 1.0. In addition, the diffraction order utilized with embodiment E of diffraction grating 1 is the fourth order. The particular parameters for embodiment E of diffraction 10 are summarized in the Table.

Figure 7:
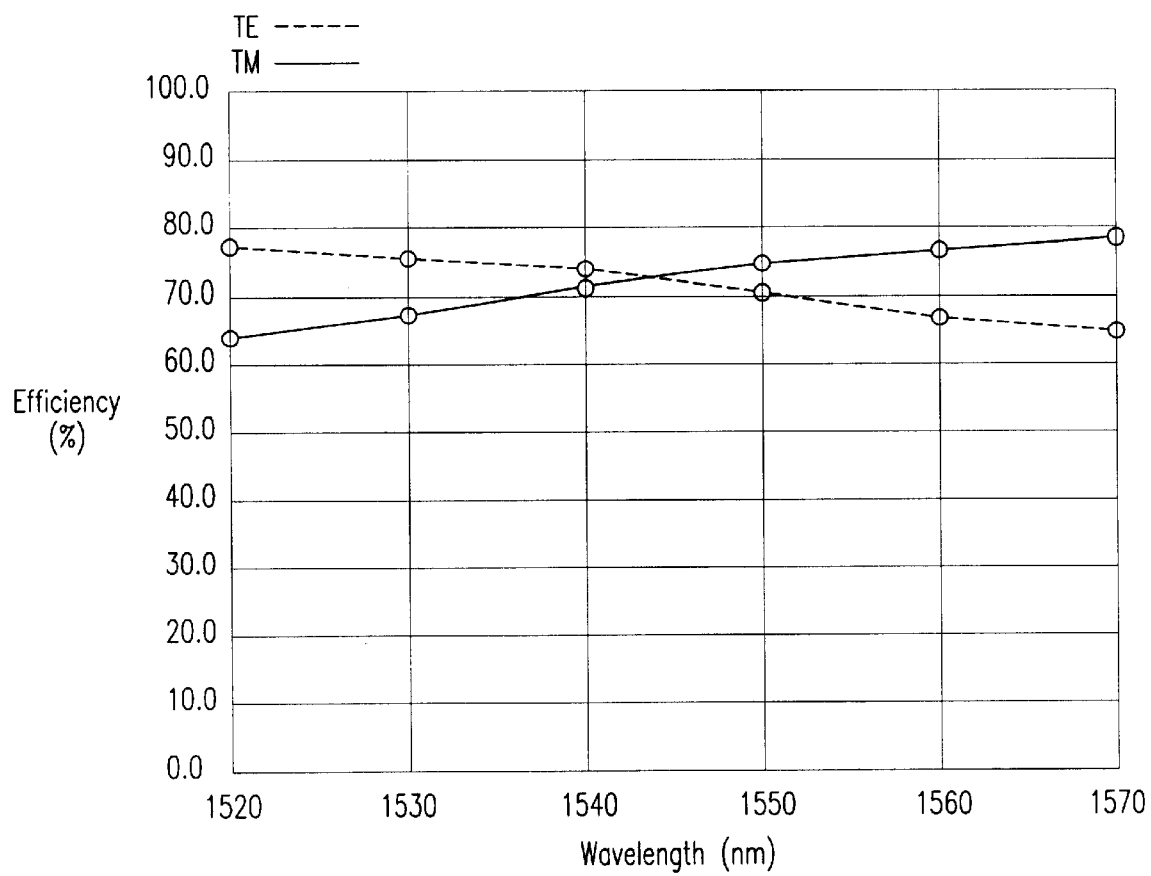

FIG. 7 illustrates the resulting performance of embodiment F of diffraction grating 1 having the grating parameter values described above, based upon receiving an apolarized optical signal as an input. As can be seen, the efficiency of both the transverse electric polarization state TE and the transverse magnetic polarization state TM exceed 60% over the C-band wavelength range. Further, because the efficiencies of transverse electric polarization state TE and transverse magnetic polarization state TM somewhat closely follow each other across the C-band wavelength range, embodiment F of diffraction grating 1 diffracts substantially apolarized optic rays in response to receiving an apolarized input optical signal. Still further, the cross-over point for the efficiency of the transverse electric polarization state TE and the efficiency for the transverse magnetic polarization state TM occurs in the C-band wavelength range, and particularly around the midpoint thereof. The high efficiency combined with the location of the efficiency cross-over point result in embodiment F of diffraction grating 1 providing enhanced optical performance in the C-band wavelength range.

Figure 8:
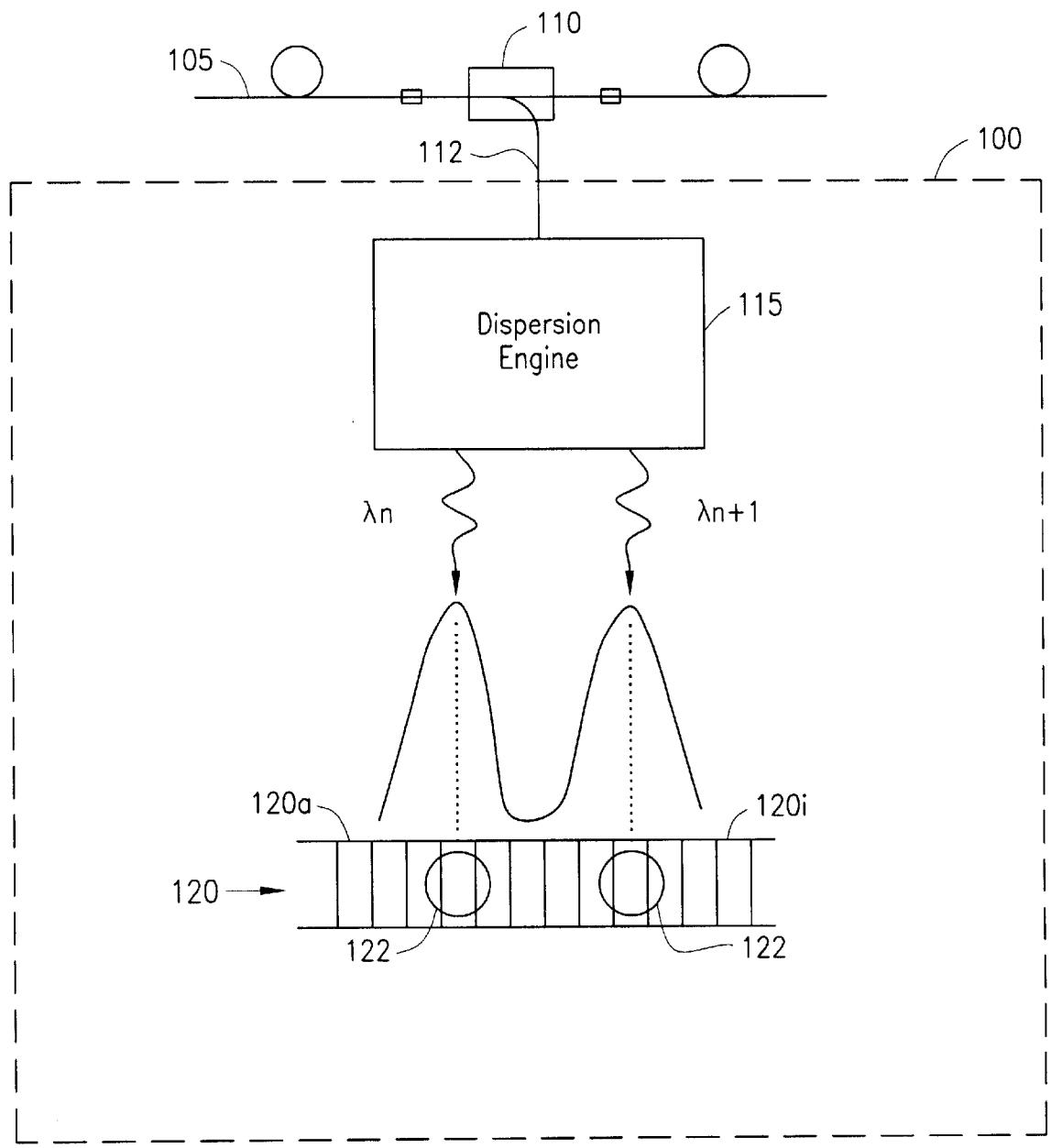
FIG. 8 is a block diagram of an optical performance monitor (OPM) device according to an embodiment of the present invention.

FIG. 8 is a representative block diagram of an optical performance monitor (OPM) 100 in accordance with an embodiment of the present invention. In a fiber optic network, a fiber optic line 105 carries a polychromatic or wavelength division multiplexed optical signal. An optical splitter or tap coupler 110 is coupled to the fiber optic line 105 to tap power from the polychromatic optical signal traveling through the fiber optic line 105. In the present embodiment, less than about 1% of the power of the polychromatic optical signal traveling through the fiber optic line 105 is tapped. It is understood, however, that the amount of power being tapped from the polychromatic signal appearing on fiber optic line 105 may be in excess of 1% of the total power thereof.

A dispersion component 115 receives the tapped polychromatic optical signal from the optical splitter 110 via the tapped optical fiber 112. In accordance with the embodiments of the present invention, the dispersion component 115 is diffraction grating 1. Diffraction grating 1 separates the polychromatic optical signal into narrowband optical signals (i.e., each narrowband optical wavelength of the polychromatic optical signal is separated by the dispersion component 115). Each narrowband optical signal is applied to an optical detector array 120 composed of a plurality of optical elements or pixels 120a–120i. The optical detector array 120 may be composed of indium gallium arsenide (InGaAs), which provides for low noise and is infrared-sensitive. It should be understood that optical detectors having different compositions can be utilized for the optical detector array 120.

FIG. 8 further illustrates the measurement of each wavelength using the linear optical detector array 120. The optical detector array 120 may have numerous pixels or detector (photodiode) elements. By way of one example, optical detector array 120 may have 256 pixels. Shown on the optical detector array 120 are two spots formed by two adjacent narrowband signals.

Figure 9A:
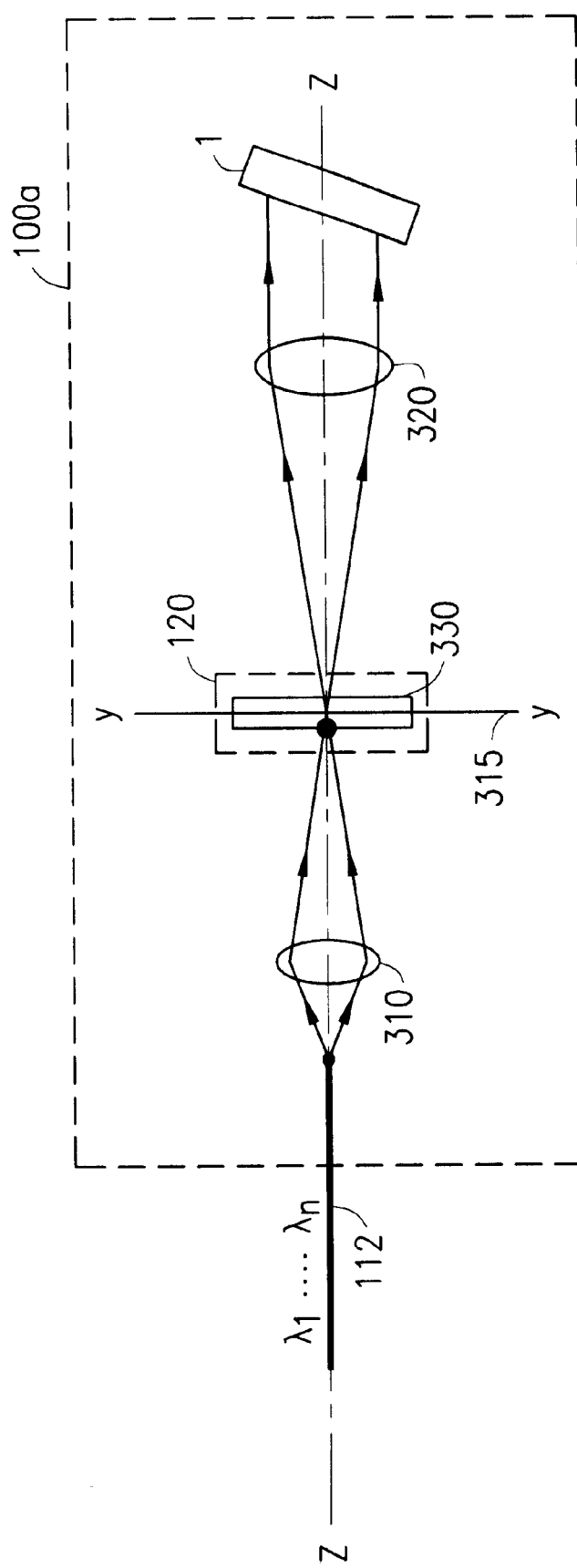
FIGS. 9A–9C illustrate optical paths of the OPM device of FIG. 8 according to embodiments of the present invention.

FIG. 9A is a block diagram representation of an optics path 100a of the OPM 100. Input optical fiber line 112 carries a polychromatic optical signal that has been tapped from fiber optic line 105. A focusing lens 310 receives the output of the input optical fiber line 112 and focuses the output optical signal from the input optical fiber line 112 to an intermediate focal plane 315.

The intermediate image at the intermediate focal plane 315 is collimated by a collimating lens 320 onto diffraction grating 1. The polychromatic optical signal is diffracted by diffraction grating 1 and the narrowband optical signals that comprise the polychromatic optical signal are focused back at the intermediate focal plane at 315 by the collimating lens 320. The diffraction grating 1 diffracts the narrowband optical signals that comprise the polychromatic optical signals based on the wavelength of the narrowband optical signals.

The spots formed back at the intermediate focal plane 315 are reflected along the y-axis of the intermediate focal plane 315 according to the wavelength of the narrowband optical signals. If the beam formed by the focusing lens 310 is aimed below the central axis of the collimating lens 320, then the beams reflecting from the diffraction grating 1 are re-formed by the collimating lens 320 above its central axis.

A fold mirror 330 deflects the narrowband optical beams into a detector array 120. The fold mirror 330 is placed to ensure that the diffracted spots are in focus at the optical detector array 120.

It should be understood that other embodiments of the optics path of OPM device 100 are possible without departing from the principles of the present invention.

Figure 9B:
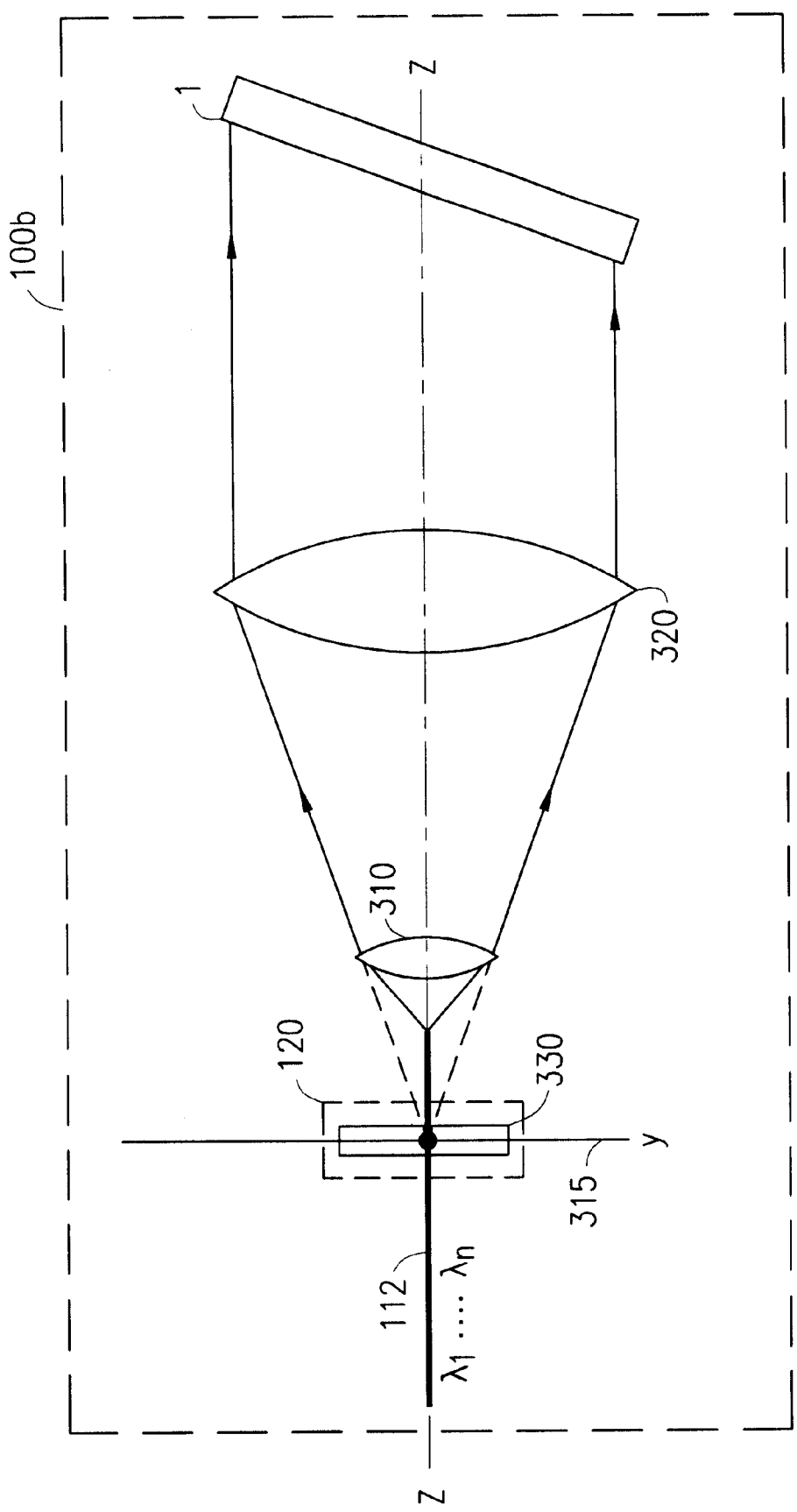

FIG. 9b is an alternate embodiment of an optics path 100b of the OPM device 100 of FIG. 8. In this configuration, the input optical fiber line 112 is placed at a location where the focusing lens 310 creates a virtual focal plane 315 behind the end of the input optical fiber line 112. The fold mirror 330 is again placed at the intermediate focal plane 315 to reflect the narrowband optical beam onto the optical detector array 120.

Figure 9C:
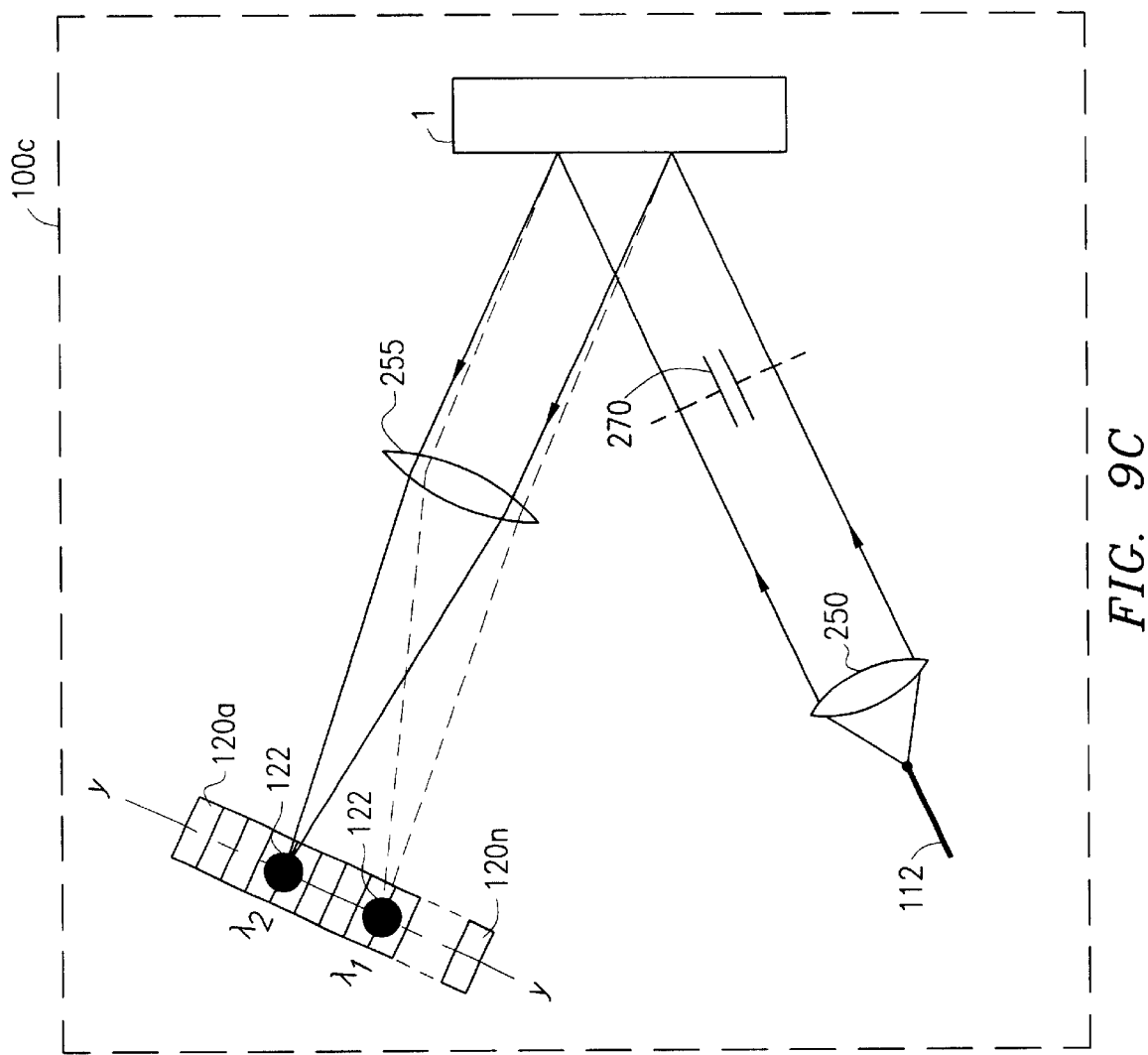

FIG. 9c is another embodiment of an optics path 100c of the OPM. The input fiber optic line 112, which carries the wavelength division multiplexed optical signal, is optically coupled to a collimating lens assembly 250. The collimating lens assembly 250 is disposed to transmit the collimated wavelength division multiplexed optical signal onto the diffraction grating 1. The diffraction grating 1 reflects/diffracts the collimated wavelength division multiplexed optical signal as narrowband optical signals onto a focusing lens 255. The optical sensor 120 composed of an array of detector elements 120a–120n is located at the y-axis and receives the narrowband optical signals as spots 122. It is understood that optics path 100c may include an aperture stop 270 at any of a number of locations within optics path 100c to increase the spot size by diffracting the narrowband optical signals. The spots 122 are spaced according to FIG. 8.

Spectrometer designs, such as optical performance monitor 100, that use linear detector arrays 120 function by forming a beam of (sampled) optical energy, refracting and/or diffracting the beam to create a wavelength-dependent deflection (known as dispersion). The diffracted beam is then focused onto the optical detector array 120 to form a spot. Spot position on the optical detector array 120 is a function of wavelength of the narrowband optical signal.

In the case of a wavelength division multiplexed signal, each individual narrowband optical signal forms a spot on the optical detector array 120 at a location as a function of wavelength.

Figure 10:
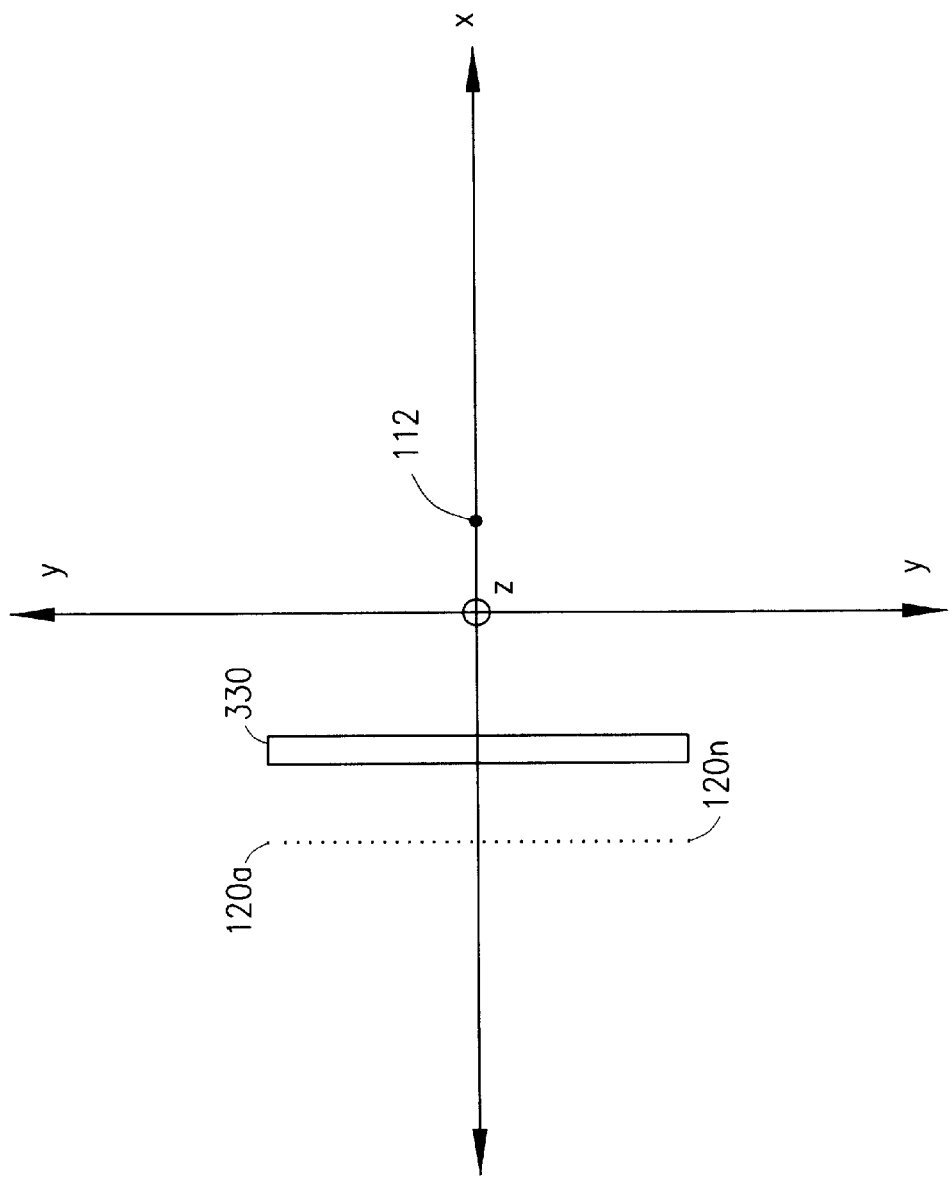
FIG. 10 is a graph showing the relative x-axis and y-axis positions of an input fiber optic line, a fold mirror, and an optical detector array of the optical path according to FIG. 9A.

FIG. 10 is a graph showing the relative x-axis and y-axis locations of the input optical fiber line 112, the fold mirror 330, and the optical detector array 120. In general, the input optical fiber line 112 is placed on the x-axis such that the reflection from the diffraction grating (not shown), which is located along the z-axis, has a total of approximately 3° reflection across the z-axis back to the fold mirror 330. Other reflection angles are possible and it should be understood that multiple input optical fiber lines 112, multiple fold mirrors 330, and multiple optical detector arrays 120 may be utilized in a single optical performance monitor utilizing a single diffraction grating 1.

Figure 11:
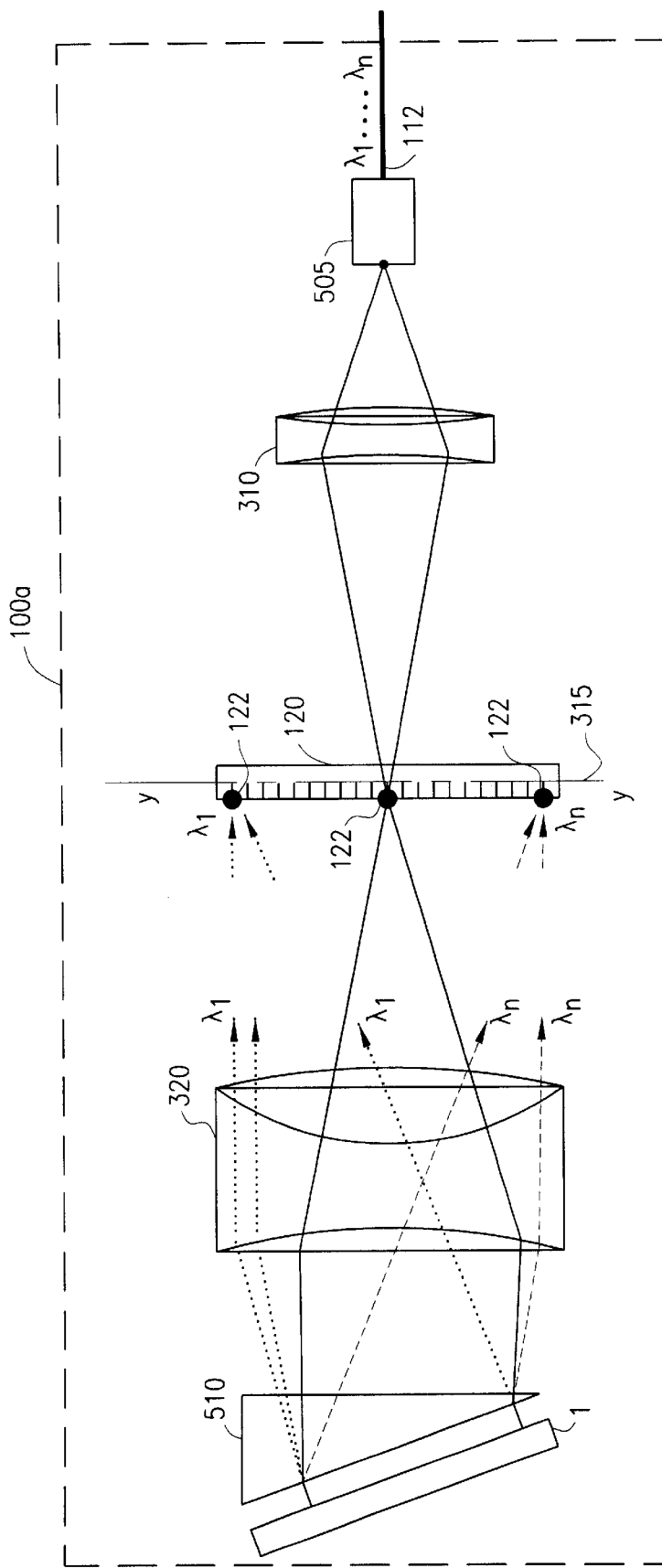
FIG. 11 is a detailed side elevational view of the optical paths of FIG. 9A.

FIG. 11 is a more detailed representation of the optical path 100a of the optical performance monitor 100 as shown in FIG. 9A. The input optical fiber line 112 carries the polychromatic optical signal, which includes the narrowband optical signals $\lambda_1$–$\lambda_n$.

An input launch 505 supports the input optical fiber line 112 to maintain a precise and stable position of the input optical fiber line 112. The focusing lens 310 focuses the polychromatic optical signal to an intermediate focal plane 315. The polychromatic optical signal is then passed through the collimating lens 320, which may include a bi-concave lens and one or more plano-convex lenses. The collimating lens 320 collimates the polychromatic optical signal, which then enters a prism 510. The prism 510 bends the polychromatic optical signal onto the diffraction grating 1 at a near-Littrow condition.

The diffraction grating 1 diffracts the polychromatic optical signal into its narrowband optical signal components as a function of the wavelength of the narrowband optical signals. The narrowband optical signals are reflected back through the prism 510 in the collimating lens 320 and focused onto the optical detector array 120 located at the intermediate focal plane 315. As shown, the optical detector array 120 is located at the intermediate focal plane 315 rather than a fold mirror (not shown) reflecting the narrowband optical signals onto the optical detector array 120. It should be understood that a fold mirror could be located at the intermediate focal plane as shown in FIG. 9A.

Figure 12:
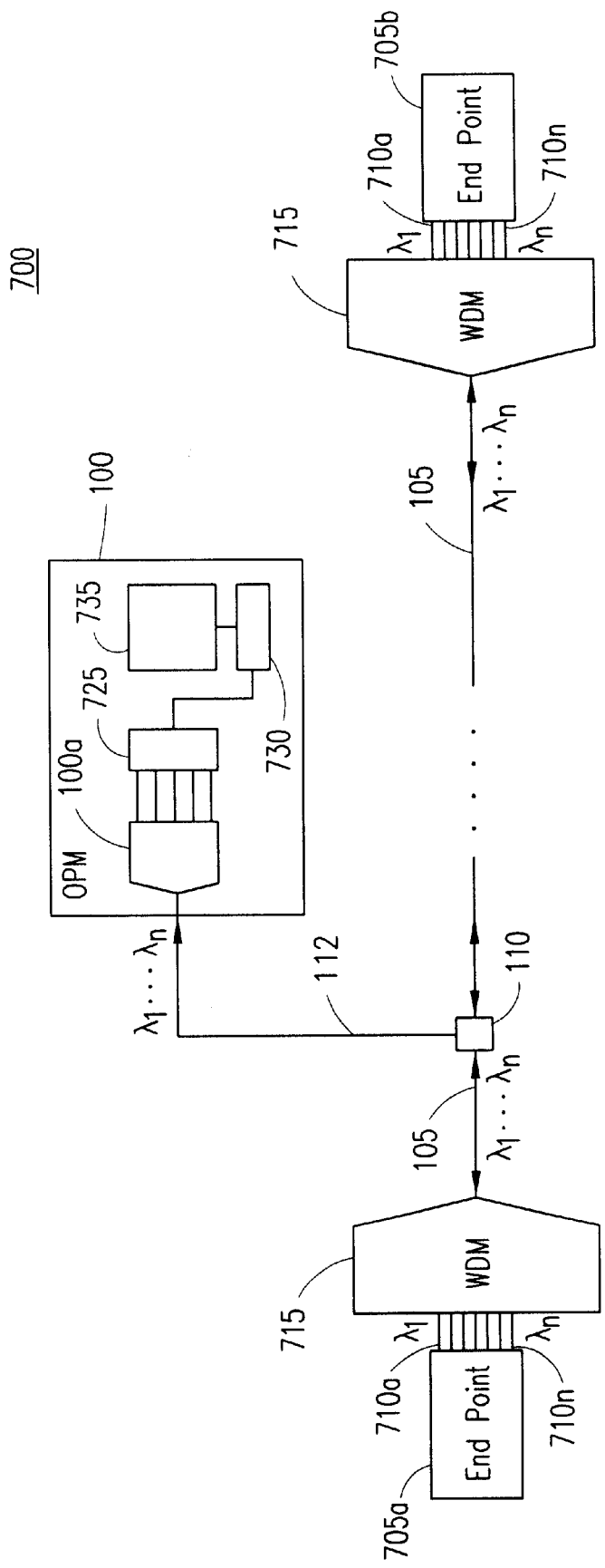
FIG. 12 is a block diagram of an optical communications system according to an embodiment of the present invention.

FIG. 12 shows a block diagram of an exemplary optical network 700. The exemplary optical network 700 includes two end points 705a and 705b. The two end points represent, possibly, two different cities that are in fiber optic communication. At each city, a network operator maintains the fiber optic network equipment. At each end point 705a and 705b, a plurality of fiber optic lines 710a–710n carry narrowband optical signals ranging from $\lambda_1$–$\lambda_n$. Each narrowband optical signal $\lambda_1$–$\lambda_n$ is a time division multiplexed optical signal and is wavelength division multiplexed by a wavelength division multiplexer 715. The multiplexed narrowband optical signals $\lambda_1$–$\lambda_n$ are inserted into the fiber optic line 105.

The optical splitter 110 extracts and routes a percentage of the power of the polychromatic optical signal. An optical performance monitor 100 receives the polychromatic optical signal from the input optical fiber line 112. The optics path 100a demultiplexes the polychromatic optical signal into its narrowband optical signals and applies them onto optical detector array 120 (not shown in FIG. 12). The optical detector array 120 converts the power of each narrowband optical signal in parallel and electronics 725 prepare the measurements for a processor 730. The processor 730 performs various monitoring calculations on the converted power of the narrowband optical signals. A display 735, which may or may not be associated with processor 730, is utilized to display the results of the calculations as performed by the processor 730. Alternatively, the optical performance monitor 100 may be connected to a network and the results of the processing of the narrowband optical signals can be communicated over the network. The network may be a wide area network, such as the Internet, or a local area network.

The use of diffraction grating 1 within OPM device 100 results in a high efficiency device for performing substantially polarization insensitive optical signal monitoring operations. For instance, OPM device 100, in accordance with embodiments of the present invention, may achieve a polarization dependent loss of less than approximately 1 dB, and particularly less than 0.5 dB, with an insertion loss of less than 0.7 dB. Due in part to the angular dispersion provided by diffraction grating 1, OPM device 100 may handle more than 40 channels with channel spacing of approximately 0.8 nm over the C-band or L-band wavelength range. With such high efficiency monitoring performance, the optical path of the present OPM device 100 may be a passive path. By eliminating the need for active components, OPM device 100 of the embodiments of the present invention thereby reduces power and conserves energy.

Figure 13:
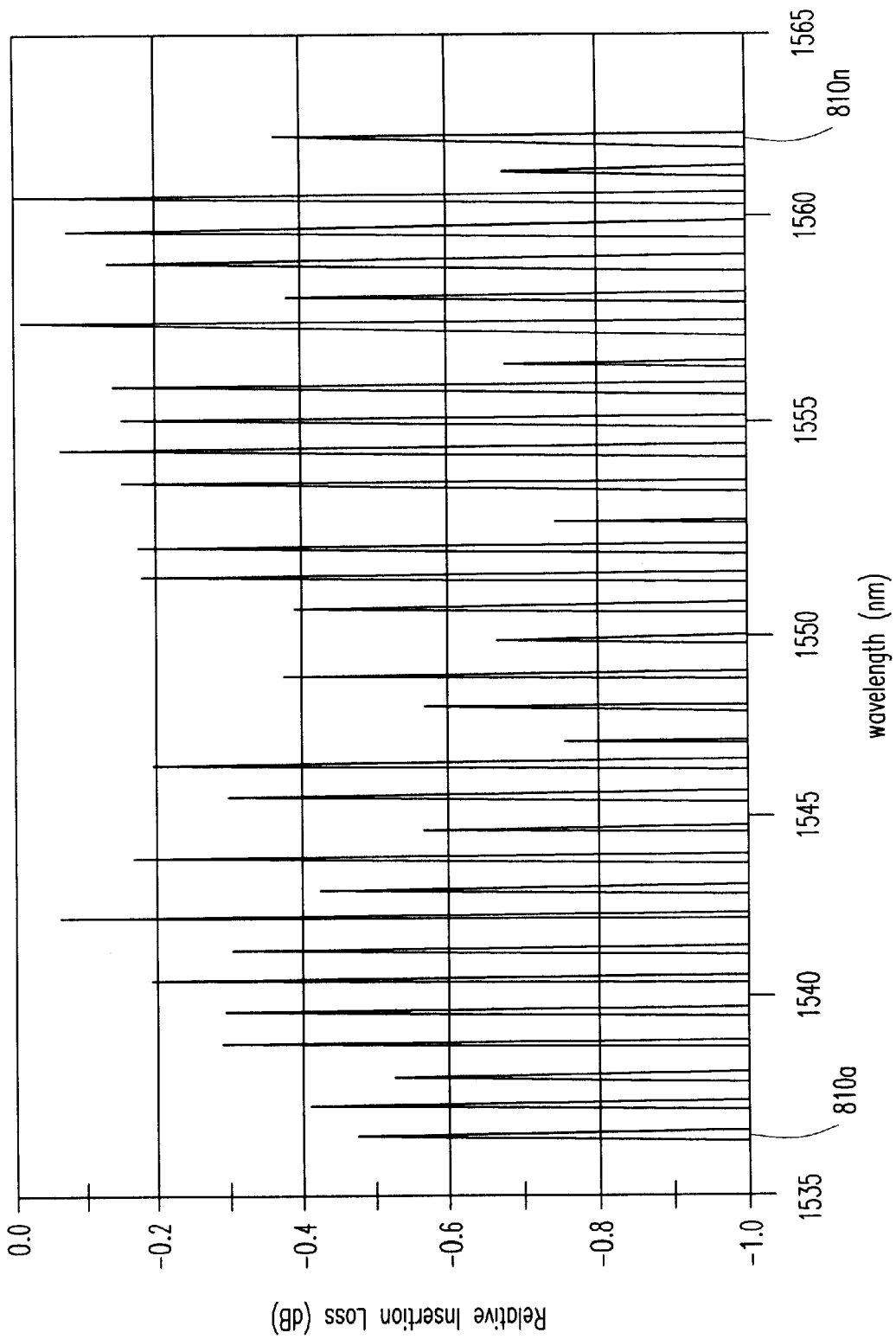
FIG. 13 is a representative graph showing insertion loss for each optical wavelength measured by the optical performance monitor according to FIG. 8.
Figure 14A:
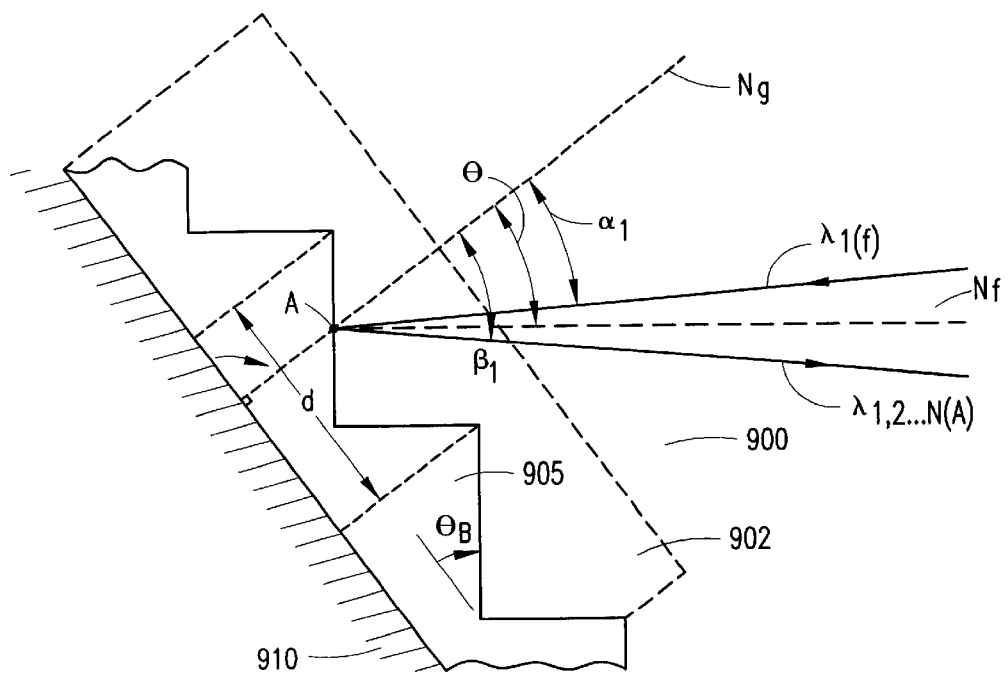
FIGS. 14A–14C illustrate the general concepts relating to diffraction gratings.
Figure 14B:
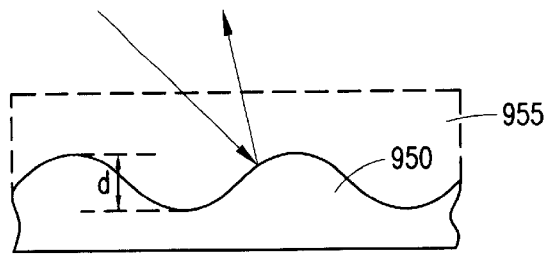
Figure 14C:
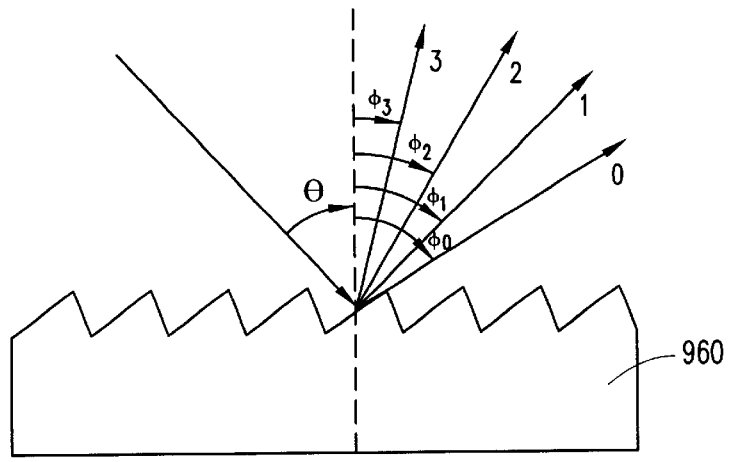

FIG. 13 is a representative graph showing insertion loss for each narrowband optical signal measured and displayed by the optical performance monitor 100. As shown, each narrowband optical channel 810a–810n is located at a particular wavelength. The insertion loss variation across the narrowband optical signals or channels 810a–810n across the C-band is less than 0.7 decibels (dB). An operator of fiber optic network 700 can determine if a problem exists on one of the narrowband optical signals 710a–710n by simply inspecting the relative losses.

It is understood that although diffraction grating 1 may be associated with and/or included in passive devices and networks, it is understood that diffraction grating 1 may be utilized in devices and networks having active components which may perform one or more of a variety of active functions, including optical amplification.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. An optical device for monitoring operating conditions of a multiplexed optical signal in an optical communications network, comprising:

an input port coupled to a fiber optic line for receiving a multiplexed optical signal appearing thereon;

a diffraction grating disposed relative to and in optical communication with the input port so as to diffract the multiplexed optical signal received at the input port as a demultiplexed optical signal having a plurality of narrowband optical signals over a wavelength range of at least approximately 30 nm, within the wavelength range the optical device is substantially polarization insensitive; and an optical detector optically coupled to the diffraction grating and including a plurality of detector elements disposed to receive the narrowband optical signals and convert each narrowband optical signal into an electrical signal having a value representative of a power level of the corresponding narrowband optical signal.

2. The optical device of claim 1, wherein:

the optical device has a polarization dependent loss of less than approximately 1 dB over the wavelength range.

3. The optical device of claim 1, wherein:

the optical device has a polarization dependent loss of less than approximately 0.5 dB over the wavelength range.

4. The optical device of claim 1, wherein:

the number of narrowband optical signals comprise at least 8.

5. The optical device of claim 1, wherein:

the diffracted narrowband optical signals include transverse electric and transverse magnetic polarization states, each transverse electric and transverse magnetic polarization state having at least 40% of the power of a corresponding transverse electric and transverse magnetic polarization state, respectively, of the multiplexed optical signal.

6. The optical device of claim 1, wherein:

the diffraction grating has an efficiency of at least 40% over the wavelength range.

7. The optical device of claim 1, wherein:

the diffracted narrowband optical signals include transverse electric and transverse magnetic polarization states, each transverse electric and transverse magnetic polarization state having at least 80% of the power of a corresponding transverse electric and transverse magnetic polarization state, respectively, of the multiplexed optical signal.

8. The optical device of claim 1, wherein:

the diffraction grating has an efficiency of at least 80% over the wavelength range.

9. The optical device of claim 1, wherein:

the wavelength range includes at least one of the C-band wavelength range and the L-band wavelength range;

the diffracted narrowband optical signals include transverse electric and transverse magnetic polarization states; and the loss of the transverse electric polarization state and the loss of the transverse magnetic polarization state, relative to power levels of corresponding transverse electric and transverse magnetic polarization states, respectively, of the multiplexed optical signal are substantially equal at one or more wavelengths approximately within the wavelength range.

10. The optical device of claim 1, wherein:

the diffracted narrowband optical signals include transverse electric and transverse magnetic polarization states; and for each output optical signal, the difference between the loss of the transverse electric polarization state and the loss of the transverse magnetic polarization state, relative to power levels of corresponding transverse electric and transverse magnetic polarization states, respectively, of the multiplexed optical signal is less than approximately 20% loss.

11. The optical device of claim 1, wherein:

the diffracted narrowband optical signals include transverse electric and transverse magnetic polarization states; and for each output optical signal, the difference between the loss of the transverse electric polarization state and the loss of the transverse magnetic polarization state, relative to power levels of corresponding transverse electric and transverse magnetic polarization states, respectively, of the multiplexed optical signal is less than approximately 10% loss.

12. The optical device of claim 1, wherein:

the wavelength range includes at least one of the C-band and L-band wavelength ranges.

13. The optical device of claim 1, further comprising:

a lens disposed between and optically coupled to the diffraction grating and the optical detector.

14. The optical device of claim 1, further comprising:

a fold mirror optically coupled to the diffraction grating and the optical detector.

15. A method of performing an operation on an optical signal, comprising:

receiving a multiplexed optical signal;

diffracting the multiplexed optical signal into a plurality of narrowband optical signals, each narrowband optical signal being diffracted at a distinct angle within a wavelength range of at least 30 nm and having polarization states whose power levels are substantially the same as power levels of corresponding polarization states of the multiplexed optical signal; and converting at least one of the narrowband optical signals into an electrical signal having a value representative of a power level of the at least one narrowband optical signal.

16. The method of claim 15, wherein:

the narrowband optical signals include transverse electric and transverse magnetic polarization states, each transverse electric and transverse magnetic polarization state having at least 40% of the power of a corresponding transverse electric and transverse magnetic polarization state, respectively, of the multiplexed optical signal.

17. The method of claim 15, wherein:

the efficiency of the diffracting of the multiplexed optical signal is at least 40% over the wavelength range.

18. The method of claim 15, wherein:

the narrowband optical signals include transverse electric and transverse magnetic polarization states, each transverse electric and transverse magnetic polarization state having at least 80% of the power of a corresponding transverse electric and transverse magnetic polarization state, respectively, of the multiplexed optical signal.

19. The method of claim 15, wherein:

the efficiency of the diffracting of the multiplexed optical signal is at least 80% over the wavelength range.

20. The method of claim 15, wherein:

the wavelength range includes at least one of the C-band and L-band wavelength ranges;

the narrowband optical signals include transverse electric and transverse magnetic polarization states; and the loss of the transverse electric polarization state and the loss of the transverse magnetic polarization state, relative to power levels of corresponding transverse electric and transverse magnetic polarization states of the multiplexed optical signal, respectively, are substantially equal at one or more wavelengths approximately within the wavelength range.

21. The method of claim 15, wherein:

the narrowband optical signals include transverse electric and transverse magnetic polarization states; and for each narrowband optical signal, the difference between the loss of the transverse electric polarization state and the loss of the transverse magnetic polarization state, relative to power levels of corresponding transverse electric and transverse magnetic polarization states of the multiplexed optical signal, respectively, is less than approximately 20%.

22. The method of claim 15, wherein:

the narrowband optical signals include transverse electric and transverse magnetic polarization states; and for each narrowband optical signal, the difference between the loss of the transverse electric polarization state and the loss of the transverse magnetic polarization state, relative to power levels of corresponding transverse electric and transverse magnetic polarization states of the multiplexed optical signal, respectively, is less than approximately 10%.

23. The method of claim 15, wherein;

the wavelength range includes at least one of the C-band and L-band wavelength ranges.

24. The method of claim 15, further comprising:

collimating the diffracted narrowband optical signals.

25. The method of claim 15, wherein the diffracting comprises:

diffracting the multiplexed optical signal into at least 8 narrowband optical signals.

26. A optical device, comprising:

a means for receiving a multiplexed optical signal;

a means for diffracting the multiplexed optical signal into a plurality of narrowband optical signals, each narrowband optical signal being diffracted at a distinct angle within a wavelength range of at least 30 nm and having polarization states whose power levels are substantially the same as power levels of corresponding polarization states of the multiplexed optical signal; and a means for converting at least one of narrowband optical signals into an electrical signal.

27. The optical device of claim 26, wherein:

the narrowband optical signals include transverse electric and transverse magnetic polarization states, each transverse electric and transverse magnetic polarization state having at least 40% of the power of a corresponding transverse electric and transverse magnetic polarization state, respectively, of the multiplexed optical signal.

28. The optical device of claim 26, wherein:

the efficiency of the diffracting of the multiplexed optical signal is at least 40% over the wavelength range.

29. The optical device of claim 26, wherein;

the narrowband optical signals include transverse electric and transverse magnetic polarization states, each transverse electric and transverse magnetic polarization state having at least 80% of the power of a corresponding transverse electric and transverse magnetic polarization state, respectively, of the multiplexed optical signal.

30. The optical device of claim 26, wherein:

the efficiency of the diffracting of the multiplexed optical signal is at least 80% over the wavelength range.

31. The optical device of claim 26, wherein:

the narrowband optical signals include transverse electric and transverse magnetic polarization states; and the loss of the transverse electric polarization state and the loss of the transverse magnetic polarization state, relative to power levels of corresponding transverse electric and transverse magnetic polarization states, respectively, of the multiplexed optical signal are substantially equal at one or more wavelengths approximately within the wavelength range.

32. The optical device of claim 26, wherein:

the narrowband optical signals include transverse electric and transverse magnetic polarization states; and for each narrowband optical signal, the difference between the loss of the transverse electric polarization state and the loss of the transverse magnetic polarization state, relative to power levels of corresponding transverse electric and transverse magnetic polarization states of the multiplexed optical signal, respectively, is less than approximately 20%.

33. The optical device of claim 26, wherein:

the narrowband optical signals include transverse electric and transverse magnetic polarization states; and for each narrowband optical signal, the difference between the loss of the transverse electric polarization state and the loss of the transverse magnetic polarization state, relative to power levels of corresponding transverse electric and transverse magnetic polarization states of the multiplexed optical signal, respectively, is less than approximately 10%.

34. The optical device of claim 26, wherein:

the wavelength range includes at least one of the C-band and L-band wavelength ranges.

35. The optical device of claim 26, wherein:

the number of narrowband optical signals is at least 8.

36. The optical device of claim 26, further comprising:

a means for collimating the diffracted narrowband optical signals.

37. A optical device for monitoring operating conditions of a multiplexed optical signal in an optical communications network, comprising:

an input port coupled to a fiber optic line for receiving a multiplexed optical signal appearing thereon;

a diffraction grating optically coupled to the input port, comprising:

a blazed reflective material having a number of grooves per millimeter and a blazed angle between about 27 degrees and about 39 degrees; and an optically transmissive material disposed adjacent the reflective material having an index of refraction (n), wherein the number of grooves per millimeter is approximately equal to $(500\pm10)*n$; and an optical detector, optically coupled to the diffraction grating and including a plurality of detector elements disposed to convert optical signals emitted from the diffraction grating into electrical signals.

38. The optical device of claim 37, wherein:

the index of refraction of the optically transmissive material is between about 1.44 and about 1.64;

the number of grooves per millimeter on the diffraction grating is between about 710 and about 790; and the blaze angle is between about 27 and about 32 degrees.

39. The optical device of claim 37, wherein:

the diffraction order associated with the lowest loss is the first order.

40. The optical device of claim 37, wherein:

the index of refraction of the optically transmissive material is between about 1.44 and about 1.64;

the number of grooves per millimeter on the diffraction grating is between about 850 and about 950; and the blaze angle is between about 31 and about 34 degrees.

41. The optical device of claim 37, wherein:

the index of refraction of the optically transmissive material is between about 1.44 and about 1.64;

the number of grooves per millimeter on the diffraction grating is between about 950 and about 1050; and the blaze angle is between about 34 and about 39 degrees.

42. An optical device for monitoring operating conditions of a multiplexed optical signal in an optical communications network, comprising:

an input port coupled to a fiber optic line for receiving a multiplexed optical signal appearing thereon;

a diffraction grating optically coupled to the input port, comprising:

a reflective material with a sinusoidal surface having a number of grooves per millimeter and a groove depth; and an optically transmissive material disposed adjacent the reflective material having an index of refraction (n), wherein the number of grooves per millimeter is approximately equal to $(500 \pm 110)*n$ and the groove depth in nm is approximately $(685 \pm 40)/n$; and an optical detector optically coupled to the diffraction grating and including a plurality of detector elements disposed to convert optical signals emitted from the diffraction grating into electrical signals.

43. The optical device of claim 42, wherein:

the index of refraction of the optically transmissive material is between about 1.44 and 1.64; and the reflective material of the diffraction grating has a groove depth between about 420 nm and about 470 nm.

44. The optical device of claim 42, wherein:

the diffraction order associated with the lowest loss is the first order.

45. The optical device of claim 42, wherein:

the reflective material of the diffraction grating is at least one of the following: gold material, aluminum material and silver material.

46. The optical device of claim 42, wherein:

the diffraction grating includes a substantially planar substrate on which the reflective material is disposed.

47. The optical device of claim 42, wherein:

the index of refraction is between about 1.44 and 1.64; and the number of grooves per millimeter is between about 700 and about 800.

48. An optical device for monitoring operating conditions of a multiplexed optical signal in an optical communications network, comprising:

an input port coupled to a fiber optic line for receiving a multiplexed optical signal appearing thereon;

a diffraction grating optically coupled to the input port, comprising:

a blazed reflective material having a number of grooves per millimeter and a blaze angle between about thirty-seven and about forty degrees; and an optically transmissive material disposed adjacent the reflective material having an index of refraction (n), wherein the number of grooves per millimeter is approximately equal to $(200 \pm 40)*n$; and an optical detector optically coupled to the diffraction grating and including a plurality of detector elements disposed to convert optical signals emitted from the diffraction grating into electrical signals.

49. The optical device of claim 48, wherein:

the diffraction order associated with the lowest loss is the fourth order.

50. The optical device of claim 48, wherein:

the reflective material comprises at least one of the following materials: gold material, aluminum material and silver material.

51. The optical device of claim 48, wherein:

the index of refraction is between about 1.44 and about 1.64; and the number of grooves per millimeter of the diffraction grating is between about 260 and about 340.

52. The optical device of claim 48, wherein:

the diffraction grating includes a substantially planar substrate.

53. An optical device for monitoring operating conditions of a multiplexed optical signal in an optical communications network, comprising:

an input port coupled to a fiber optic line for receiving a multiplexed optical signal appearing thereon;

a diffraction grating optically coupled to the input port, comprising:

a blazed reflective material having a number of grooves per millimeter and a blaze angle between about forty-one and about forty-four degrees; and an optically transmissive material disposed adjacent the reflective material having an index of refraction (n), wherein the number of grooves per millimeter is approximately equal to $(450 \pm 40)*n$; and an optical detector optically coupled to the diffraction grating and including a plurality of detector elements disposed to convert optical signals emitted from the diffraction grating into electrical signals.

54. The optical device of claim 53, wherein:

the diffraction order associated with the lowest loss is the second order.

55. The optical device of claim 53, wherein:

the reflective material of the diffraction grating comprises at least one of the following materials: gold material, silver material and aluminum material.

56. The optical device of claim 53, wherein:

the index of refraction is between about 1.44 and about 1.64; and the number of grooves per millimeter on the diffraction grating is between about 560 and about 640.

57. The optical device of claim 53, wherein:

the diffraction grating includes a substantially planar substrate.

58. An optical device for monitoring operating conditions of a multiplexed optical signal in an optical communications network, comprising:

an input port coupled to a fiber optic line for receiving a multiplexed optical signal appearing thereon;

a diffraction grating optically coupled to the input port, comprising:

a blazed reflective material having a number of grooves per millimeter and a blaze angle between about sixty-eight and about seventy-six degrees; and an optically transmissive material disposed adjacent the reflective material having an index of refraction (n), wherein the number of grooves per millimeter is approximately equal to $(200 \pm 20)*n$; and an optical detector optically coupled to the diffraction grating and including a plurality of detector elements disposed to convert optical signals emitted from the diffraction grating into electrical signals.

59. The optical device of claim 58, wherein:

the diffraction order associated with the lowest loss is the fifth order.

60. The optical device of claim 58, wherein:

the reflective material of the diffraction grating comprises at least one of the following materials: gold material, aluminum material and silver material.

61. The optical device of claim 58, wherein:

the index of refraction is approximately one; and the number of grooves per millimeter appearing on the diffraction grating is between about 180 and about 220.

62. The optical device of claim 58, wherein:

the diffraction grating includes a substantially planar substrate.

63. An optical device for monitoring operating conditions of a multiplexed optical signal in an optical communications network, comprising:

an input port coupled to a fiber optic line for receiving a multiplexed optical signal appearing thereon;

a diffraction grating optically coupled to the input port, comprising:

a blazed reflective material having a blazed surface with a blaze angle between about fifty and about fifty-six degrees; and an optically transmissive material disposed substantially adjacent the reflective material having an index of refraction, the reflective material having a number of grooves per millimeter being within a range approximately defined by the equation $(250\pm30)*n$, wherein n is the index of refraction of the optically transmissive material; and an optical detector optically coupled to the diffraction grating and including a plurality of detector elements disposed to convert optical signals emitted from the diffraction grating into electrical signals.

64. The optical device of claim 63, wherein:

the diffraction order associated with the lowest loss is the fourth order.

65. The optical device of claim 63, wherein:

the reflective material of the diffraction grating comprises at least one of the following materials: gold material, aluminum material and silver material.

66. The optical device of claim 63, wherein:

the diffraction grating includes a substantially planar substrate.

67. The optical device of claim 63, wherein:

the index of refraction of the optically transmissive material is approximately one; and the number of grooves per millimeter appearing on the diffraction grating is between about 220 and about 280.

* * * * *